US012600429B2

(12) United States Patent
Chung

(10) Patent No.: US 12,600,429 B2
(45) Date of Patent: Apr. 14, 2026

(54) UNIVERSAL ROTATION FRONT STEERING FOR A RIDING DEVICE

(71) Applicant: RC INNOVATION, LLC, Berkeley, CA (US)

(72) Inventor: Rasyad Chung, Berkeley, CA (US)

(73) Assignee: RC INNOVATION, LLC, Berkeley, CA (US)

( * ) Notice: Subject to any disclaimer, the term of this patent is extended or adjusted under 35 U.S.C. 154(b) by 422 days.

(21) Appl. No.: 18/310,655

(22) Filed: May 2, 2023

(65) Prior Publication Data

US 2023/0356798 A1 Nov. 9, 2023

Related U.S. Application Data

(60) Provisional application No. 63/337,713, filed on May 3, 2022.

(51) Int. Cl.
*B62K 5/08* (2006.01)
*B62K 5/10* (2013.01)

(52) U.S. Cl.
CPC . *B62K 5/08* (2013.01); *B62K 5/10* (2013.01)

(58) Field of Classification Search
CPC .......... B62K 15/008; B62K 5/08; B62K 5/10; B62K 3/002; B62K 21/02; A63C 17/012; A63C 17/015
See application file for complete search history.

(56) References Cited

U.S. PATENT DOCUMENTS

| | | | | |
|---|---|---|---|---|
| 6,520,517 | B1 * | 2/2003 | Chung | .................. B62K 21/00 |
| | | | | 280/124.11 |
| 9,550,108 | B2 * | 1/2017 | Blanchard | .......... A63C 17/0093 |
| 11,383,150 | B1 * | 7/2022 | Chung | .............. A63C 17/0093 |
| 11,420,703 | B2 * | 8/2022 | Virag | ..................... B62K 3/002 |
| 2013/0307240 | A1 * | 11/2013 | Petutschnig | ....... A63C 17/0066 |
| | | | | 280/87.042 |
| 2019/0176926 | A1 * | 6/2019 | McGowan | ............... B62K 5/08 |

* cited by examiner

*Primary Examiner* — George C Jin

(74) *Attorney, Agent, or Firm* — Fox Rothschild LLP

(57) ABSTRACT

Riding devices such as bicycles, scooters, and personal mobility devices include four rigid bodies, three revolute joints, and further include a front hanger and wheels that universally rotate around a front hanger pivot axis, a front truck assembly with twist steering, and a rear truck assembly with lean steering, where the twist steering is independent of the lean steering, and where a deck rotates about a longitudinal roll axis between a front virtual pivot point in the front hanger and a rear virtual point in the rear hanger.

18 Claims, 23 Drawing Sheets

UNIVERSAL ROTATION FRONT STEERING FOR A RIDING DEVICE

CROSS-REFERENCE TO RELATED APPLICATION(S)

This application claims under 35 U.S.C. § 119(e) the benefit of U.S. Provisional Application Ser. No. 63/337,713, filed on May 3, 2022, the entire contents of which are incorporated by reference herein.

BACKGROUND

(a) Technical Field

The present disclosure relates to a riding device, more particularly, to a universal rotation front steering for the riding device including a front truck assembly with twist steering and a rear truck assembly with lean steering, where the twist steering is independent of the lean steering.

(b) Description of the Related Art

U.S. Pat. No. 6,520,517 discloses a riding device with a type of combination steering including twist steering of front wheels and lean steering of rear wheels such that front and rear steering are controlled independently. The front steering is controlled by twisting of a front handlebar like a bicycle or scooter such that twisting the front handlebar right steers the front wheels to the right and twisting the front handlebar left steers the front wheels left. Steering of the rear wheels can be controlled by leaning on a deck, the front handlebars, and a steering column right or left. Like the rear wheels of a skateboard, leaning on the deck, the front handlebars, and the steering column to the right steers the rear wheels to the left, whereas leaning to the left steers the rear wheels to the right. Combination steering of this type can produce ride dynamics that are well known in the field. However, the arrangement of front wheels disclosed in U.S. Pat. No. 6,520,517 has limitations that may constrain a minimal width of a front wheel track and limit the ability to ride on steeply angled terrain.

FIG. 1 (PRIOR ART), which corresponds to FIG. 1 of U.S. Pat. No. 6,520,517, shows a first rigid body including a deck 12, a neck 24, a cylindrical member 22, and a rear baseplate. A second rigid body includes a steering column 18, a steering handle 20, and a channel member 28 with two leg portions 32. A third rigid body includes a front truck 15 with an axle member 26 that supports two laterally spaced wheels. A fourth rigid body is a rear truck 16 that supports laterally spaced rear wheels 40.

In U.S. Pat. No. 6,520,517, the first rigid body (i.e., the deck 12, the neck 24, and the cylindrical member 22) and the second rigid body (i.e., the steering handle 20, the steering column 18, and the channel member 28) are provided such that the steering column 18 is rotationally fitted through the cylindrical member 22. Accordingly, the connection between the first rigid body and second rigid body is understood to be a revolute joint similar to a bicycle headset offering a single degree of rotational freedom about a steering axis.

In U.S. Pat. No. 6,520,517, the connection between the second rigid body 14 (i.e., the steering handle 20, the steering column 18, and the channel member 28) and the third rigid body (i.e., the front truck 15) is such that the axle member 26 is fitted within the channel member 28. A pin 30 penetrates the leg portions 32 of the channel member 28 and the axle member 26 about a pivot axis 31, thereby pivotally coupling the axle member 26 to the steering column 18. Accordingly, the connection between the second rigid body and the third rigid body is understood to be a revolute joint axially constrained between the inner walls of the leg portions 32 of the channel member 28 offering a single degree of rotational freedom about the pivot axis 31.

The riding device disclosed in U.S. Pat. No. 6,520,517 has a front fork (i.e., the channel member 28) and a front hanger (i.e., the axle member 26) design that deliberately limits the range of rotation of the front truck 15 about the pivot axis 31 and a wide front wheel track in order to prevent unwanted front wheel contact with the channel member 28, the cylindrical member 22, and the steering column 18.

SUMMARY

The unique kinematic and mechanical design of the present disclosure overcomes limitations of the prior art while conserving and expanding upon the ride dynamics enabled by combination steering.

As described herein, a front wheel twist steering spatial mechanism includes a unique motion referred to as "universal rotation" that includes rigid bodies connected by kinematic joints and constrained by wheels on a plane of the ground. In particular, "universal rotation" is characterized by motion in which a front hanger and wheels may rotate 360 degrees, preferably about a front hanger pivot axis.

According to an embodiment of the present disclosure, a riding device for riding on a riding surface includes: a first rigid body comprising a deck, a neck, a headtube, and a rear truck base block with a rear pivot axis; a second rigid body comprising a handlebar, a riser, a fork steer tube, a fork with a front hanger pivot axis, and a front virtual pivot point; a third rigid body comprising a front hanger assembly comprising a front hanger and at least one axle, wherein the axle connects with two laterally spaced front wheels; a fourth rigid body comprising a rear hanger assembly comprising a rear hanger, at least one rear hanger pivot bolt, a rear virtual pivot point, and at least one axle, wherein the axle connects with two laterally spaced rear wheels; a rear truck assembly comprising the rear truck base block, an elastomeric component, the fourth rigid body, and a third revolute joint; a first revolute joint connecting the first rigid body with the second rigid body, wherein the first revolute joint revolves around the front twist steering axis for a twist steering motion of the front wheels; a second revolute joint with universal rotation connecting the second rigid body with the third rigid body, wherein the third rigid body and the connected front wheels universally rotate around the front hanger pivot axis; the third revolute joint connecting the first rigid body with the fourth rigid body, wherein the third revolute joint comprises a constrained first rear spherical joint and a constrained second rear spherical joint, wherein the first spherical joint and the second spherical joints rotate in constrained unison about a rear hanger pivot axis for a lean steering motion of the rear wheels, and wherein the twist steering motion of the front wheels is independent of the lean steering motion of the rear wheels; and a longitudinal roll axis along a virtual line between the front virtual pivot point and the rear virtual pivot point, wherein the first rigid body rotates about the longitudinal roll axis.

The fork may have a shape that allows the front hanger and laterally spaced front wheels to universally rotate around the front hanger pivot axis.

The rear hanger pivot axis may have an angle relative to the riding surface, wherein an increase in the angle increases the lean steering motion.

The rear hanger pivot axis may have an angle relative to the riding surface, wherein a decrease in the angle decreases the lean steering motion.

The front fork may have a C-shape with a top of the C-shape connected with the fork steer tube and a bottom of the C-shape connected with a front fork axle shaft that is coincident with the front hanger pivot axis, and the front hanger universally rotates around the front fork axle shaft at the second revolute joint for universal rotation of the second rigid body and the connected front wheels around the front hanger pivot axis.

The second revolute joint may include the front hanger, the front fork axle shaft with a threaded end, front hanger bearings, and a retaining lock nut.

The front fork may include a C-shape with a top of the C-shape connected with the fork steer tube and a bottom of the C-shape connected with a fork axle boss that is coincident with the front hanger pivot axis, and the front hanger universally rotates around the fork axle boss at the second revolute joint for universal rotation of the second rigid body and the connected front wheels around the front hanger pivot axis.

The second revolute joint may include the front hanger, the fork axle boss with a threaded bore, a front hanger compression bearing with angular thrust surface, an interior radial bearing surface, an exterior bearing surface, a compression slot, a retaining bolt, and a locking set screw.

The front fork may include an upside-down U-shape with a first fork leg, a second fork leg, and a front hanger pivot bolt that is coincident with the front hanger pivot axis, wherein the front hanger pivot bolt passes through the first fork leg, through a central pivot bore of the front hanger, and through the second fork leg, wherein the front hanger universally rotates around the front hanger pivot bolt at the second revolute joint for universal rotation of the second rigid body and the connected front wheels around the front hanger pivot axis.

Adjusting the connection between the front fork and front hanger may adjust a tolerance stack of the bearing assembly connecting the fork to the front hanger assembly.

The connection between the front fork and front hanger may be configured to be adjusted to control the speed and resistance of rotation of the front hanger around the front hanger pivot axis.

According to another embodiment of the present disclosure, a riding device for riding on a riding surface includes: a first rigid body comprising a deck, a neck, a headtube, and a rear truck base block with a rear pivot axis; a second rigid body comprising a handlebar, an integrated riser and fork connected with a steer tube base, and a cantilevered axle that is coincident with a front hanger pivot axis, wherein the steer tube base projects rearward and is connected a steer tube with a rearward offset from the integrated riser and fork, and the cantilevered axle projects rearward from the integrated riser and fork and underneath the steer tube base; a third rigid body comprising a front hanger assembly comprising a hanger and at least one axle, wherein the axle connects with two laterally spaced front wheels; a fourth rigid body comprising a rear hanger assembly comprising a hanger, at least one rear hanger pivot bolt, and at least one axle, wherein the axle connects with two laterally spaced rear wheels; a rear truck assembly comprising the rear truck base block, an elastomeric component, the fourth rigid body, and a third revolute joint; a first revolute joint connecting the first rigid body with the second rigid body, wherein the first revolute joint revolves around a front twist steering axis for a twist steering motion of the front wheels; a second revolute joint with universal rotation connecting the second rigid body with the third rigid body, wherein the third rigid body and the connected front wheels universally rotate around a front hanger pivot axis; the third revolute joint connecting the first rigid body with the fourth rigid body, wherein the third revolute joint comprises a constrained first rear spherical joint and a constrained second rear spherical joint, wherein the first spherical joint and the second spherical joints rotate in constrained unison about a rear hanger pivot axis producing a lean steering motion of the rear wheels, and wherein the twist steering motion of the front wheels is independent of the lean steering motion of the rear wheels; and a longitudinal roll axis along a virtual line between the front virtual pivot point and the rear virtual pivot point, wherein the first rigid body rotates about the longitudinal roll axis.

The cantilevered axle may be coincident with the front hanger pivot axis, and the front hanger universally rotates around the cantilevered axle at the second revolute joint for universal rotation of the second rigid body and connected front wheels around the front hanger pivot axis.

The integrated riser and fork may be configured to contact a part of the first rigid body to constrain the range of front twist steering about a front steering axis.

The rear hanger pivot axis may have an angle relative to the riding surface, wherein an increase in the angle increases the lean steering motion.

The rear hanger pivot axis may have an angle relative to the riding surface, wherein a decrease in the angle decreases the lean steering motion.

Adjusting the connection between the front fork and front hanger may adjust a tolerance stack of the bearing assembly connecting the fork to the front hanger assembly.

The connection between the front fork and front hanger may be configured to be adjusted to control the speed and resistance of rotation of the front hanger about the front hanger pivot axis.

Rigid bodies are herein defined so as not to deform under the action of applied forces.

Compliant bodies are herein defined as flexible bodies that couple and constrain the motion of the rigid bodies so as to transfer input forces and displacements to an output force and displacement at another location through elastic body deformation. Further, compliant bodies that have been compressed or deformed may produce a return spring force.

Specific joints will be described that define kinematic pairs of rigid bodies and the resultant degrees of freedom of the kinematic chain of rigid bodies of the present disclosure.

Kinematic joints are herein defined as frictionless joints.

Specific geometry of the rigid and compliant bodies and the orientation and relationship of the kinematic joints required to create the motions of the present disclosure are described herein.

Constraints on the range of motion of the kinematic joints are described herein.

Given that laterally spaced wheels in contact with and designed to roll on a surface of the ground are in common use, the kinematic joints that connect the wheels and wheel bearings to the hanger axles will not be counted in the total of degrees of freedom of the spatial mechanisms according to the present disclosure.

The plane of the ground is herein defined as the surface upon which the laterally spaced wheels roll, and the wheels are connected to the ground or a surface (i.e., a riding surface) by means of gravity. The plane of the ground is also the fixed frame of the spatial mechanism.

The ground or riding surface are herein defined as any riding surface including but not limited to the banked and vertical walls of skateboard parks and the like.

Twist steering spatial mechanisms are herein defined as spatial mechanisms where rider input twisting a handlebar produces a steering response of the front wheels on the ground. Common examples of twist steering are the front wheels of a bicycle or tricycle.

Lean steering spatial mechanisms are herein defined as spatial mechanisms where rider input leaning the deck and or handlebar side to side produces a steering response of the rear wheels on the ground. A common example of lean steering is the truck of a skateboard typically comprised of a kinematic pair of rigid bodies, a baseplate rigidly connected to a deck and a hanger and axle assembly that supports a pair of laterally spaced wheels that roll on the ground. Lean steering trucks are generally differentiated by kinematic design, geometry, and design and function of the elastomeric components.

The present disclosure discloses a class of front wheeled steering with a unique kinematic design, kinetics and ride dynamics with improved deep deck lean, improved terrain following, improved steering control, and improved straight-line stability at all speeds. By delivering this combination of functional attributes the present disclosure is thus of significant use to riders in search of improved control at all speeds when riding and performing tricks especially on the uneven and or steeply banked terrain of skateboard parks and street obstacles.

The present disclosure comprises a riding device with front twist steering and rear lean steering, with unique spatial mechanisms that allow 360 degrees of rotation of a front hanger and front wheels about a hanger pivot axis which in turn allows use of a narrow front wheel track.

BRIEF DESCRIPTION OF THE DRAWINGS

FIG. 11 shows a view of the of present disclosure with the rear wheels riding on the horizontal surface of a skateboard park with the front hanger and front wheels steering along the coping of a skateboard park.

DETAILED DESCRIPTION

The riding device of the present disclosure incorporates a front twist steering and rear lean-steering spatial mechanism.

As provided herein, the present disclosure is a spatial mechanism with a closed kinematic chain comprised of rigid bodies connected by kinematic joints as shown or by other kinematic joints known in the art that would allow the same degrees of freedom, functional geometry, and primary motions.

A spatial mechanism will allow different motions depending on the specific kinematic design, input force to the mechanism, and on how the motion is constrained. As provided herein, skateboards, scooters, roller skates, and wheeled vehicles in general utilize wheels connected to the plane of the ground by the force of gravity. As used herein, the term "ground" may mean any riding surface including but not limited to the banked and vertical walls of skateboard parks and the like.

The present disclosure has a kinematic design such that the load path of input and output forces are shared by the rigid bodies in all conditions of use.

Within the kinematic design of the present disclosure specific geometry may be adjusted to accommodate various steering response and performance requirements for a multiplicity of lean steering vehicles such as skateboards, scooters, personal electric mobility devices and the like.

All embodiments of the present disclosure share equivalent kinematics, kinetics, and ride dynamics. Therefore, all axes of rotation and virtual pivot points are numbered the same.

Equivalence of kinematics, kinetics, and ride dynamics remain constant despite the differences in the design of the rigid bodies, and in the method of connecting the rigid bodies with each other.

As used herein, a revolute joint connects a pair of rigid bodies to allow a single degree of rotational freedom about a common central axis.

As used herein, kinematic joints are considered frictionless.

Figure 1:
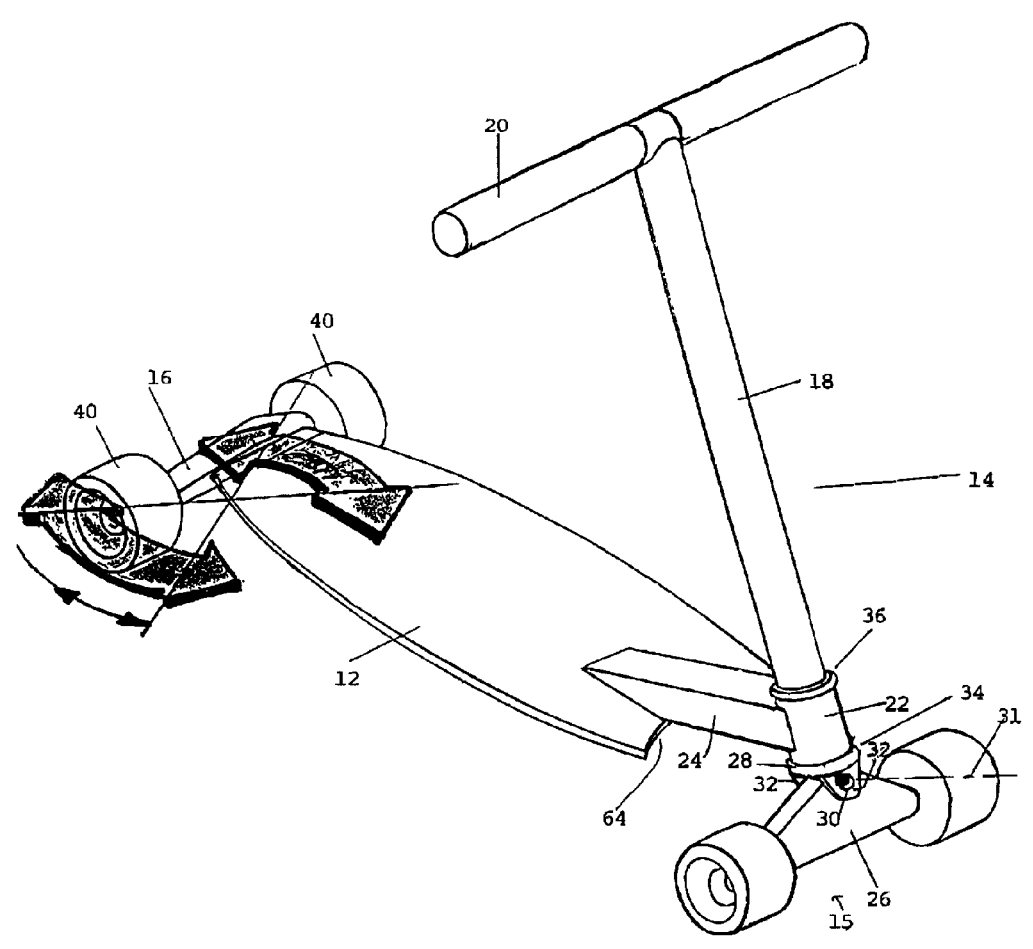
FIG. 1 (PRIOR ART) shows a front perspective view of a riding device of the prior art.
Figure 2:
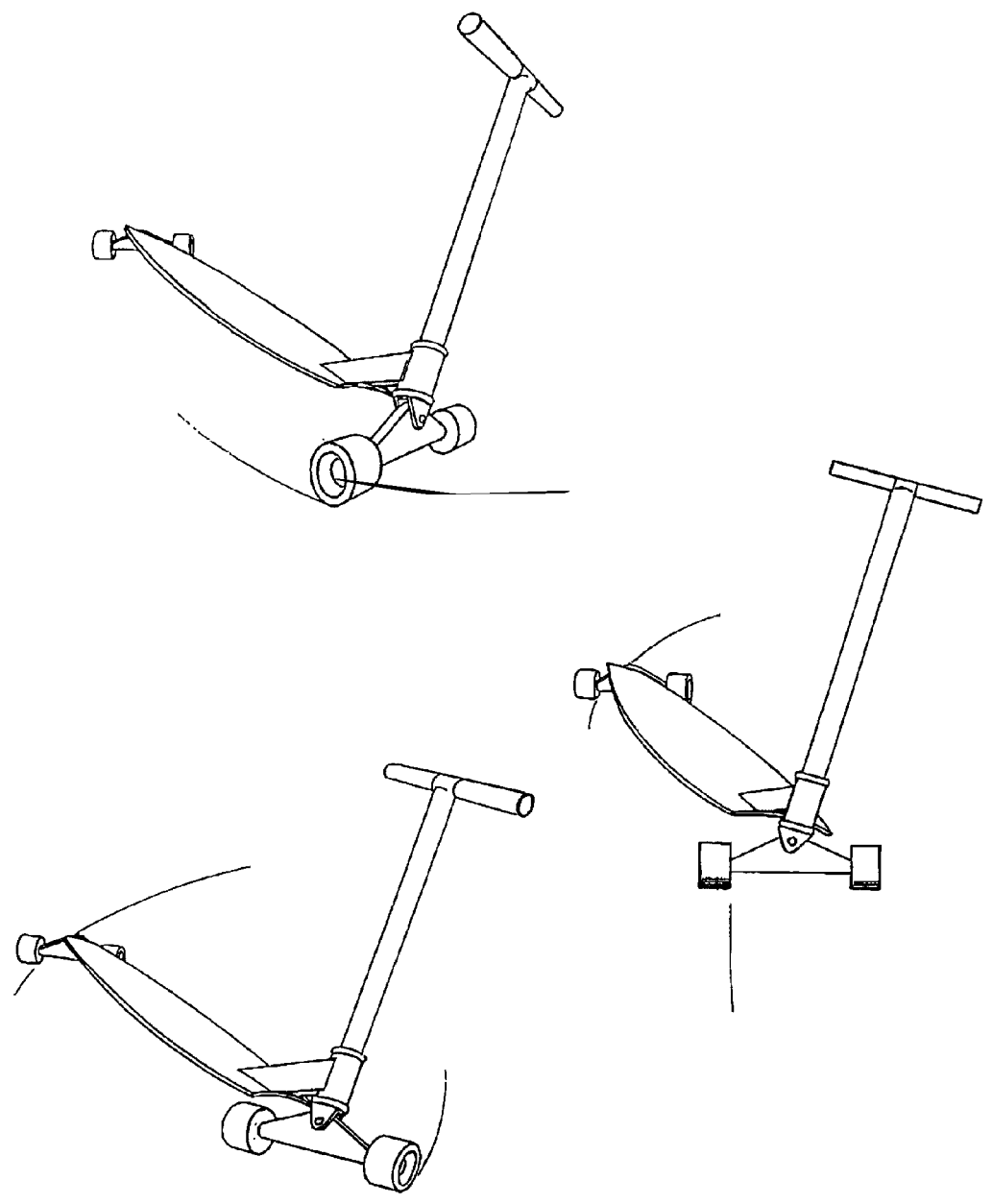
FIG. 2 (PRIOR ART) shows multiple steering and articulation views of the riding device of FIG. 1.
Figure 3:
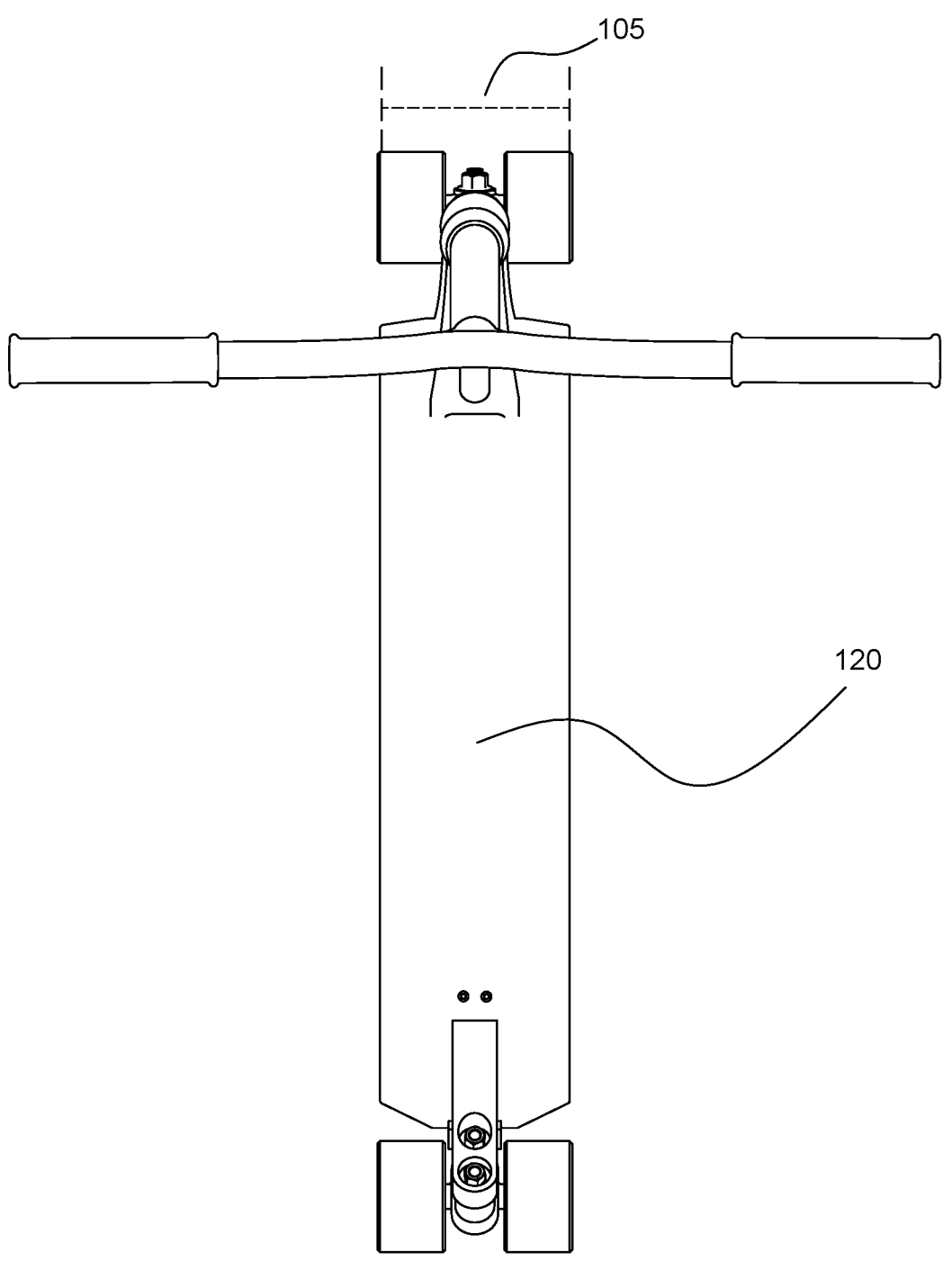
FIG. 3 shows a top view of the riding device of the present disclosure.

FIG. 3 shows a top view of the first embodiment of the present disclosure, showing a deck 120 having a width, and a front hanger with a front wheel track 105. Existing designs typically require a front wheel track that is sufficiently wide to prevent contact of the spinning front wheels with non-spinning parts of the riding device, often using a mechanical stop to limit the rotation of the front hanger about a front hanger pivot axis.

The present disclosure does not so limit the front wheel track. In the present disclosure, the front wheels may rotate 360 degrees, around the front hanger pivot axis without contacting non-spinning parts of the riding device. The wheel track width is defined as ranging between the smallest width needed to accommodate the mechanical connection between the hanger and the fork, and the widest width as needed by rideability, or by aesthetics. The present disclosure allows for the front wheel track 105 to be the same size as the deck, narrower than the deck, or wider than the deck.

Figure 4:
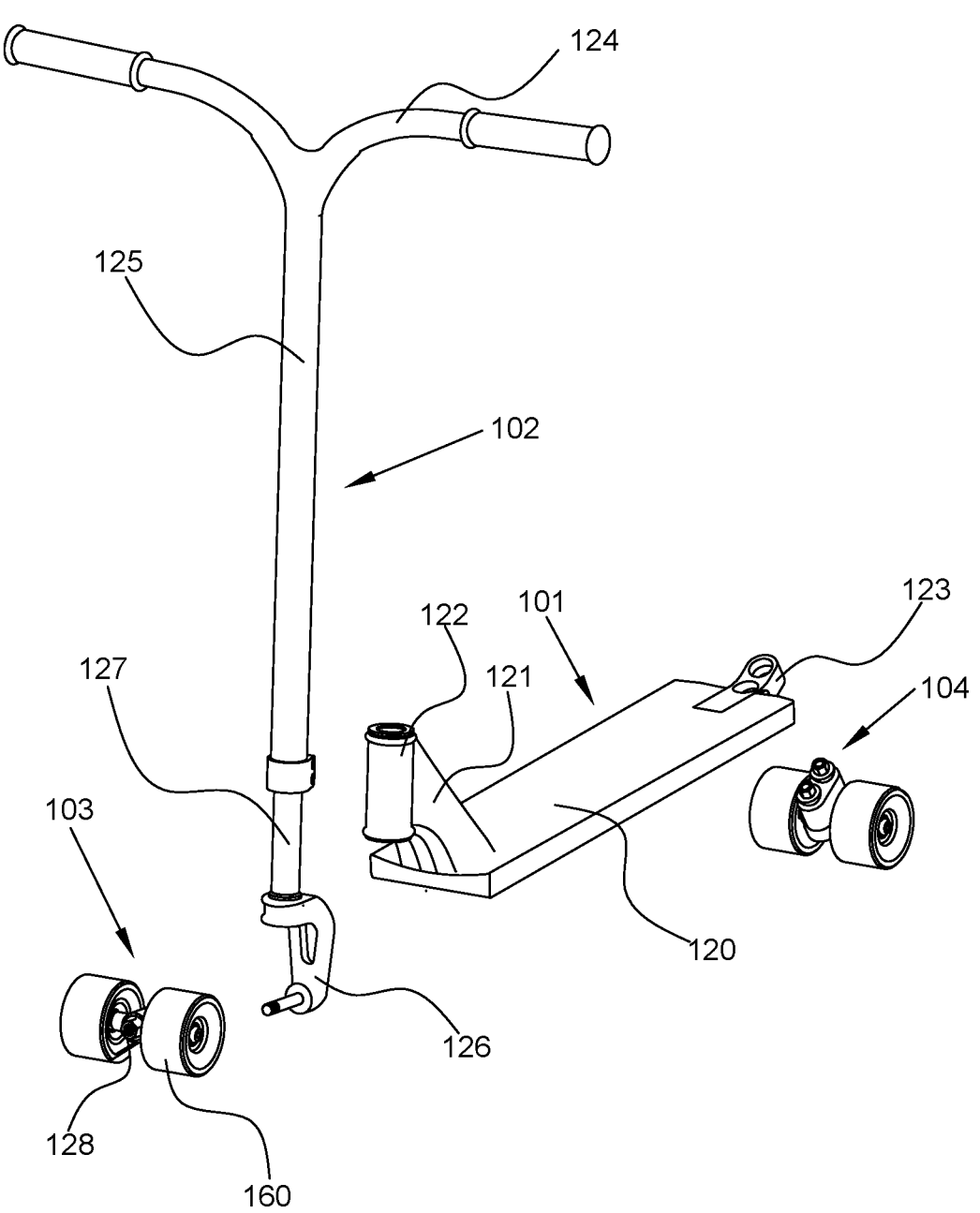
FIG. 4 shows an exploded view of the rigid bodies of a first embodiment of the present disclosure.

FIG. 4 shows the four rigid bodies of the first embodiment of the present disclosure. The four rigid bodies include a first rigid body 101, a second rigid body 102, a third rigid body 103, and a fourth rigid body 104.

The first rigid body 101 is comprised of the deck 120, a neck 121, a headtube 122, and a rear truck base block 123.

The second rigid body 102 is comprised of a handlebar 124, a handlebar riser 125, a fork 126, and a fork steer tube 127. The fork 126 has a shape that allows the front hanger and laterally spaced front wheels to revolve about the front hanger pivot axis and allows the front hanger and laterally spaced front wheels to revolve around the front axle axis.

The third rigid body 103 is comprised of a front hanger assembly comprising a front hanger 128 and at least one axle 129. The front hanger assembly supports two laterally spaced wheels 160.

The fourth rigid body 104 is comprised of a rear hanger assembly comprising a rear hanger 127, at least one axle, and at least one rear hanger pivot bolt. In a preferred embodiment there may be two rear hanger pivot bolts a first hanger pivot bolt 152a and a second hanger pivot bolt 152b. The rear hanger assembly supports two laterally spaced wheels 160.

Figure 5:
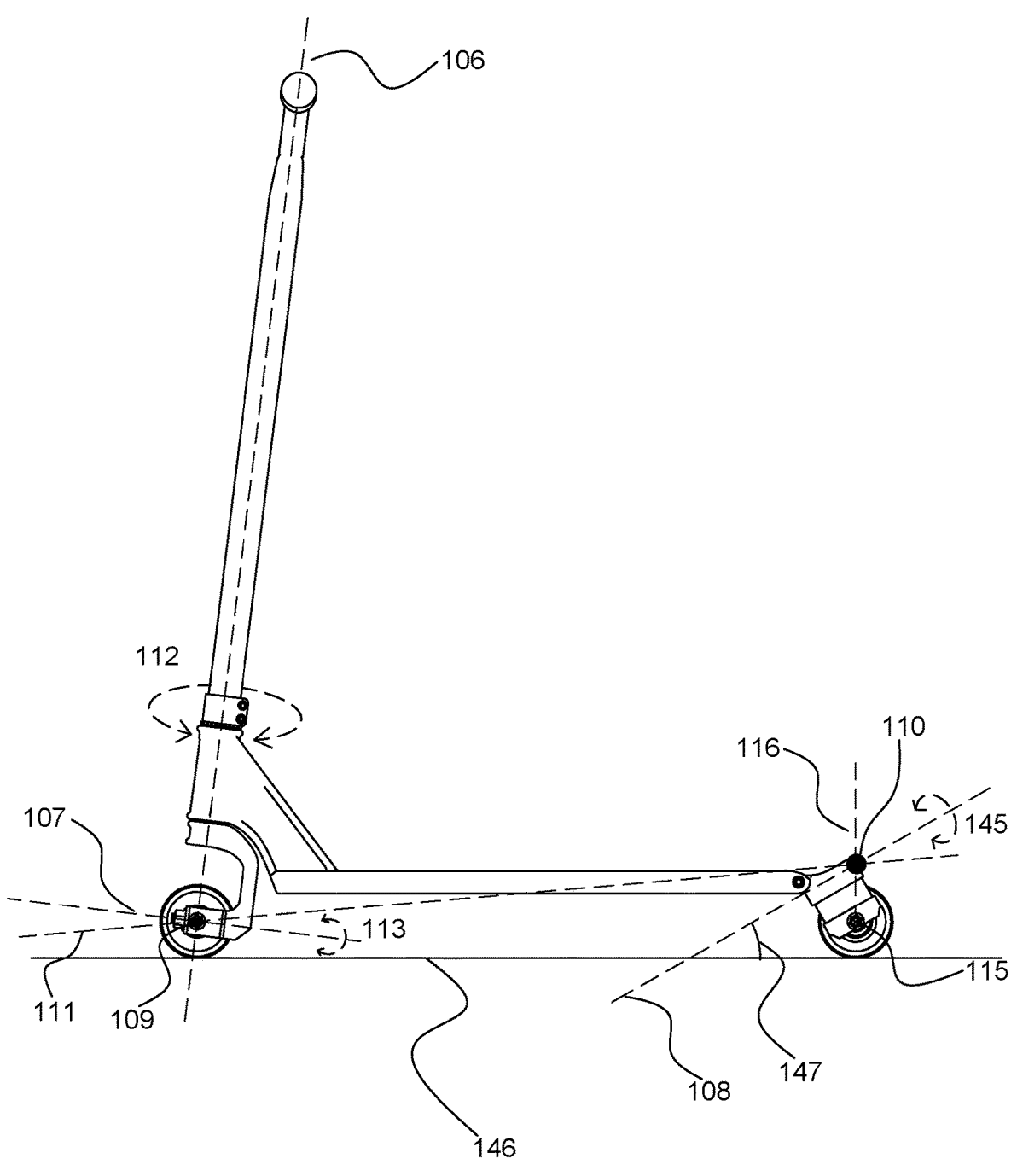
FIG. 5 shows a kinematic diagram of the first embodiment of the present disclosure.

FIG. 5 shows a kinematic diagram in which the axes of rotation are comprised of a front twist steering axis 106, a front hanger pivot axis 107, and a longitudinal roll axis 111. The present disclosure further comprises a rear hanger pivot axis 108, a front virtual point 109, a vertical line 116 projecting upward from the center of rear axle axis 115, a rear virtual pivot point 110, a first revolute joint 112, a second revolute joint 113, a third revolute joint 145, the plane of the riding surface 146, and a hanger pivot axis angle 147. The front twist steering axis 106 rotates around the first revolute joint 112. The front hanger pivot axis rotates around the second revolute joint 113. The rear hanger pivot axis 108 rotates about the third revolute joint 145. The longitudinal roll axis 111 is a virtual straight line between the front virtual pivot point 109 and the rear virtual pivot point 110. The first rigid body rotates about the longitudinal roll axis 111.

Figure 6:
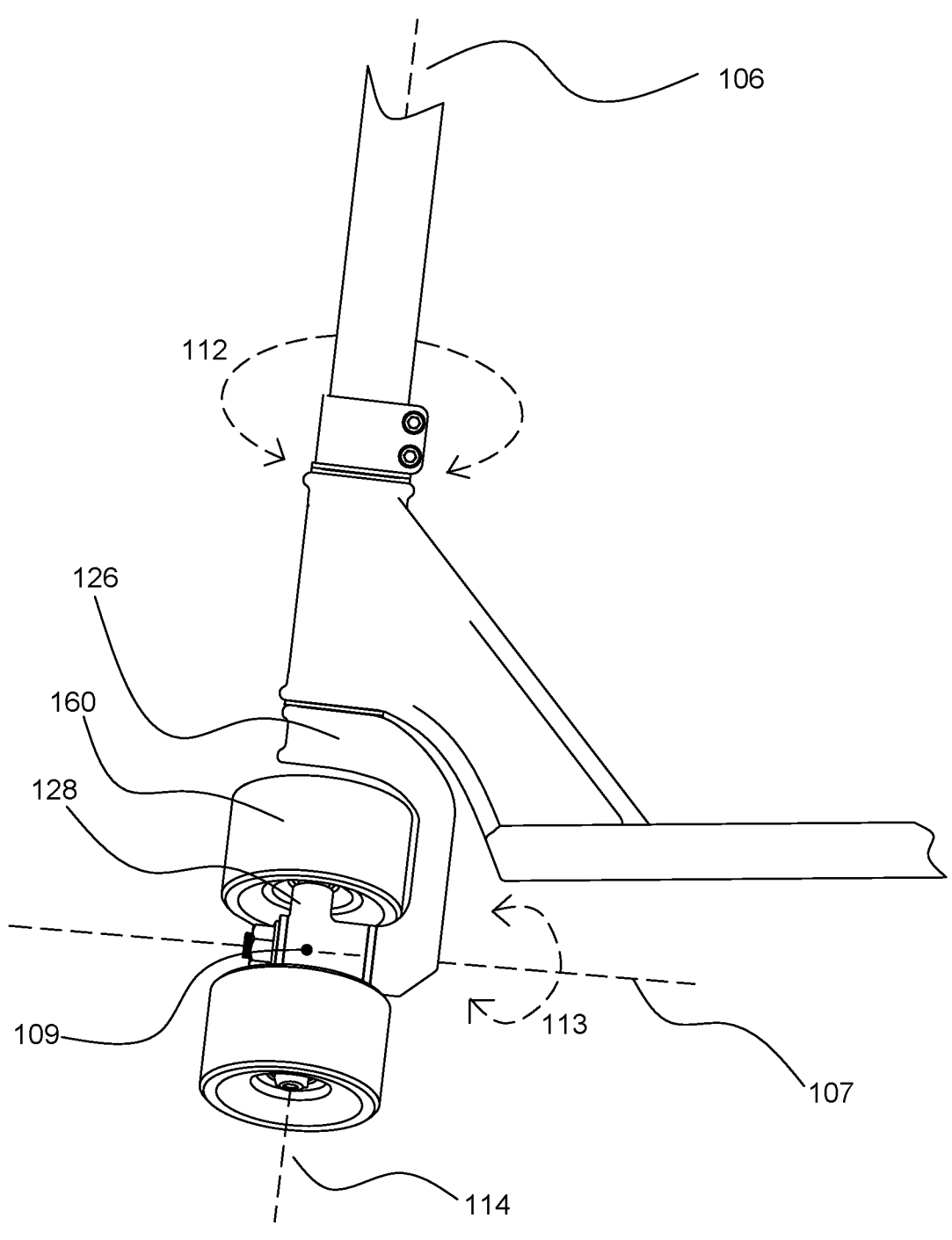
FIG. 6 shows a side view of the first embodiment of the present disclosure with the front hanger and front wheels rotated within the clearance of front fork to illustrate the motion of universal rotation of front hanger and front wheels about front hanger pivot axis.

FIG. 6 shows front hanger 128 and wheels 160 rotated about the front hanger pivot axis 107. The motion of universal rotation allows the wheels 160 to rotate through and within the provided clearance of the fork 126 such that the pair of front wheels 160 may rotate 360 degrees about the front hanger pivot axis 107 without contacting any part of the fork 126 or any other rigid body. FIG. 6 shows the wheels 160 rotated 180 degrees from the position shown in FIG. 5.

Figure 7:
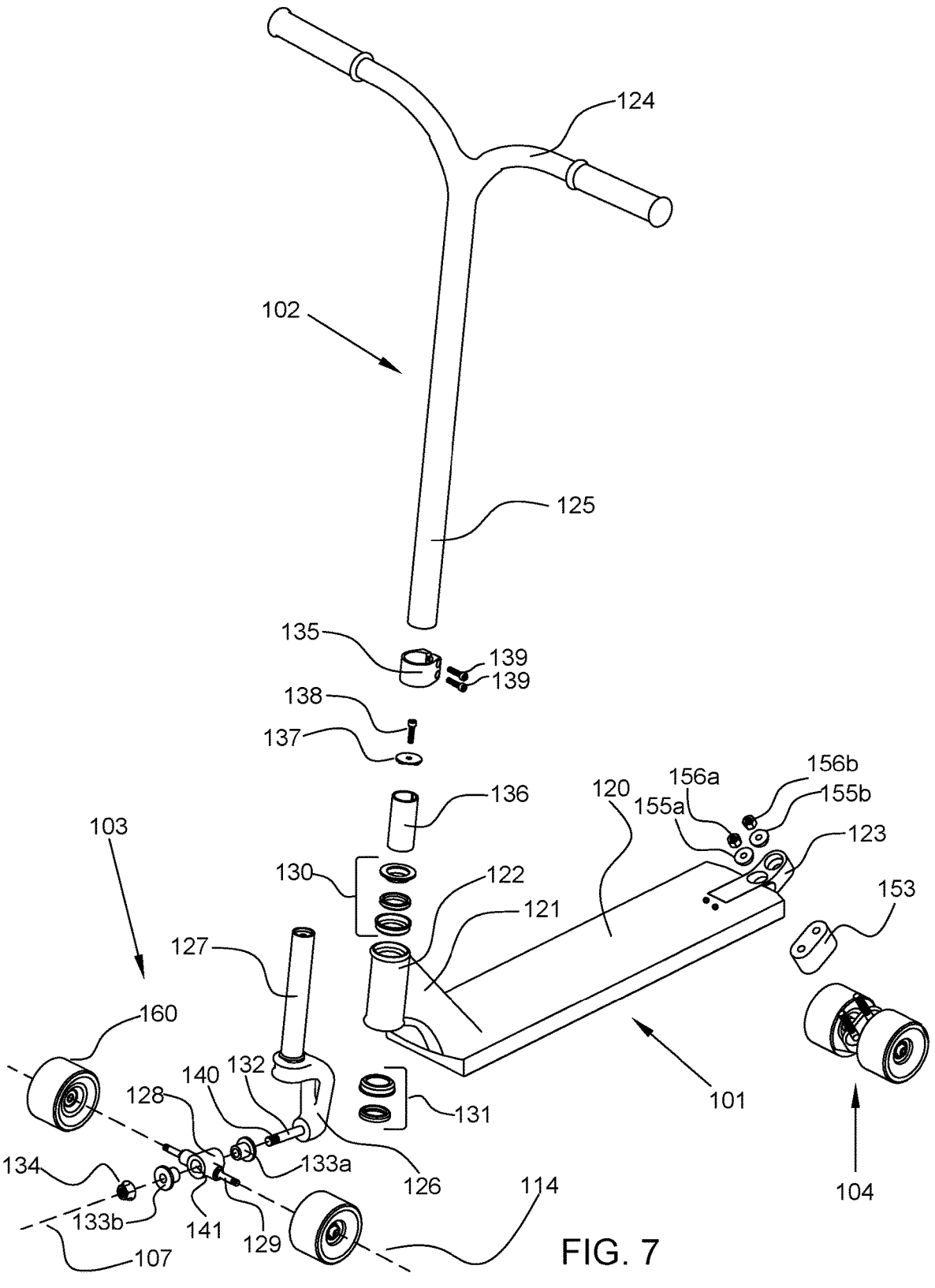
FIG. 7 shows an exploded perspective view of the first embodiment of the first embodiment of the present disclosure.

FIGS. 4-9 shows the rigid bodies of the present disclosure are comprised of the following: The first rigid body 101 is a clamped, welded or bolted together assembly comprised of the deck 120, the neck 121, the headtube 122, and the rear truck base block 123. The second rigid body 102 is a clamped, welded or bolted together assembly comprised of the handlebar 124, the handlebar riser 125, the fork 126, and the fork steer tube 127. The third rigid body 103 is a clamped, welded or bolted together assembly comprised of a front hanger assembly comprised of the front hanger 128 with at least one axle 129. The axle 129 supports two laterally spaced front wheels 160. The axle 129 may be made of one or two separate axles. As shown in FIG. 7, there may be two axles 129 that support two laterally spaced front wheels.

Figure 9:
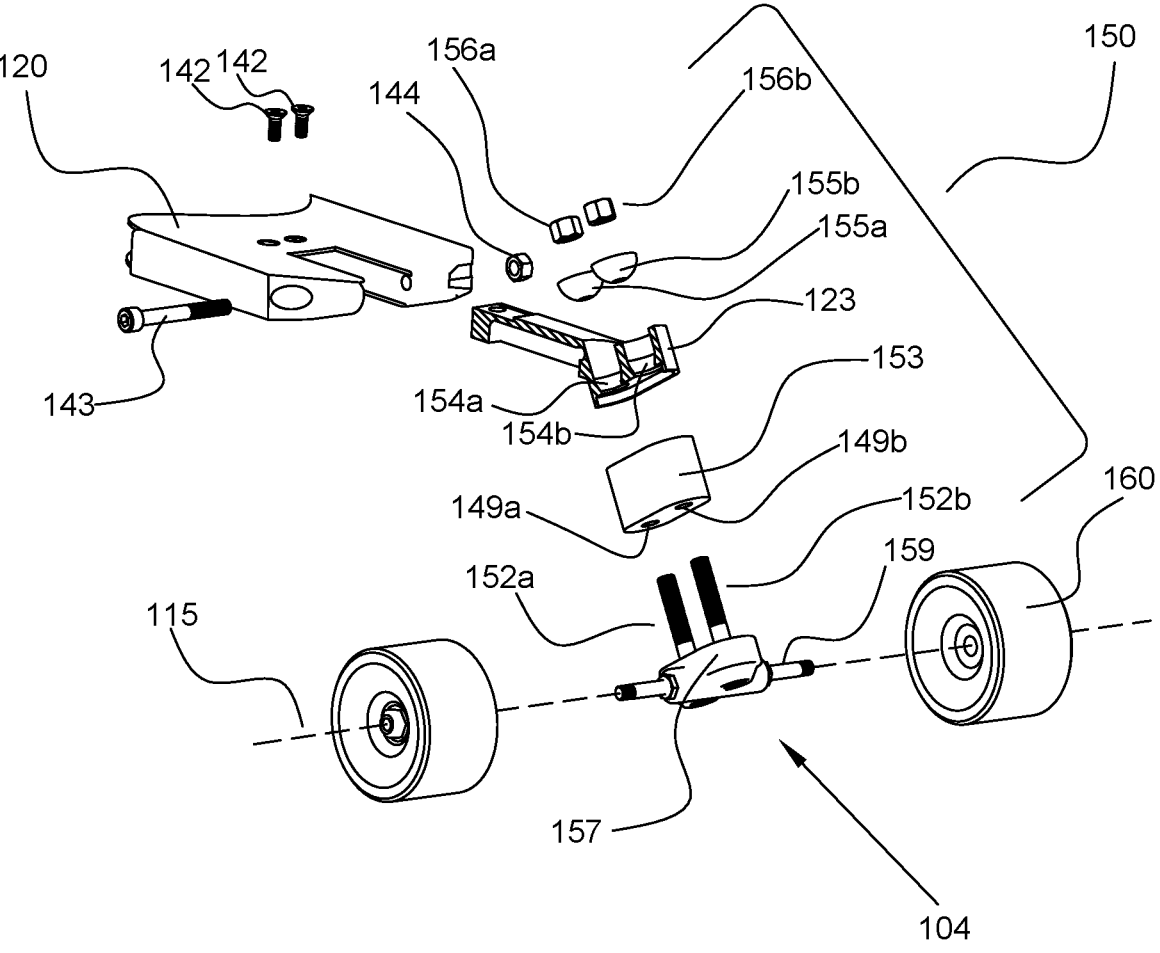
FIG. 9 shows an exploded perspective view of rear truck of the first embodiment of the present disclosure with a section view of rear truck rear truck base block.

The fourth rigid body 104 is a clamped, welded or bolted together assembly comprised of a rear hanger assembly comprised of a rear hanger 127, at least one axle 159, and at least one or optionally two rear hanger pivot bolts 152a and 152b. The axle 159 may be made of one or two separate axles. As shown in FIG. 9, there may be two axles 159 that support two laterally spaced rear wheels. It is apparent that these assemblies may be created by any other means known in the art.

FIGS. 4-9 show the first rigid body 101 connected to the second rigid body 102 by means of the first revolute joint (headset revolute joint) 112. The first revolute joint 112 revolves around the front twist steering axis 106. The second revolute joint (front hanger revolute joint) 113, connects the second rigid body 102 to the third rigid body 103, forming the front hanger pivot axis 107. The second revolute joint 113 has the motion of universal rotation of the third rigid body 103 around the front hanger pivot axis 107. Universal rotation of the second revolute joint 113 connects the second rigid body with the third rigid body, allowing the third rigid body and connected front wheels 160 to universally rotate around the front hanger pivot axis 107. Universal rotation allows the third rigid body and connected front wheels 160 to rotate 360 degrees, or more, around the front hanger pivot axis 107 when the wheels are not in contact with the ground.

The third revolute joint (rear hanger revolute joint) 145 connects the first rigid body with the fourth rigid body and rotates around the rear hanger pivot axis 108. The third revolute joint 145 comprises a constrained first rear spherical joint and a constrained second rear spherical joint. The first spherical joint and the second spherical joints rotate in constrained unison about the rear hanger pivot axis 108 producing a lean steering motion.

In a preferred embodiment, the first revolute joint 112 is comprised of upper headset bearing components 130 and lower headset bearing components 131, thus forming a front twist steering axis 106. The first revolute joint 112 may be made by other bearing assemblies as known in the art to form the front twist steering axis 106.

The fork 126 of the second rigid body 102 is connected to the third rigid body 103 by means of the second revolute joint (front hanger revolute joint) 113, revolving around the front hanger pivot axis 107. In a preferred embodiment, the second revolute joint 113 is comprised of a front fork axle shaft 132 with threaded end 140, front hanger bearings 133a and 133b, and retaining lock nut 134. Tightening or loosening retaining lock nut 134 controls the preload of front hanger bearings 133a and 133b to increase or decrease a tolerance stack of the connection between front fork 126 and front hanger 128. Tightening retaining lock nut 134 results in more preload and greater resistance to rotation of front hanger 128 about the front hanger pivot axis 107. The second revolute joint 113 revolves around the front hanger pivot axis 107. The second revolute joint 113 may be formed by other means known in the art to revolve around the front hanger pivot axis 107.

The fork 126 has a shape that allows 360-degree, or more, rotation of the front hanger 128 and attached front wheels 160 about the front hanger pivot axis 107 such that front wheels 160 do not contact any part of fork 126 when the wheels are not in contact with the ground. One such shape is shown as fork 126. In one embodiment, fork 126 has a C-shape, where a top of the C-shape (the top of the fork 126) is connected with the fork steer tube 127. The bottom of the C-shape is connected with the front fork axle shaft. The front fork axle shaft is coincident with the front hanger pivot axis, as shown in FIG. 7. The front hanger universally rotates around the front fork axle shaft at the second revolute joint 113. In other words, the front hanger may rotate 360 degrees, or more, around the front fork axle shaft for universal rotation of the second rigid body and the connected front wheels around the front hanger pivot axis. This is defined herein as the universal rotation of the second rigid body and the connected front wheels around the front hanger pivot axis so that the wheels do not contact any part of the riding device other than typical mating contact with wheels 160 and wheel axles 129.

Similarly, the neck 121 has a shape that allows 360-degree, or more, rotation of the front hanger 128 and attached front wheels 160 about the front hanger pivot axis 107 at all points of steering around the front twist steering axis 106 such that the wheels 160 may not contact any part of the neck 121 or the deck 120.

The third revolute joint (rear hanger revolute joint) 145 comprises and is defined by the constrained motions of a first rear spherical joint 117 and a second rear spherical joint 118. The rear spherical joints 117 and 118 are contained such that when assembled, the rear spherical joints 117 and 118 rotate in constrained unison about the rear hanger pivot axis 108, producing a lean steering motion.

The rear spherical joints 117 and 118 are positioned and constrained within the rear base block 123. The rear spherical joints 117 and 118 are geometrically constrained in two ways. First, the rear spherical joints 117 and 118 are contained within the rear truck base block 123 and therefore rotate in nominally fixed locations within the rear truck base block 123. Second, the motion of the rear spherical joints 117 and 118 are further constrained by the fourth rigid body 104 (comprising a rear hanger 157 and hanger pivot bolts 152a and 152b) such that when assembled, the rear spherical joints 117 and 118 are constrained to rotate in unison about the rear hanger pivot axis 108.

The rear hanger pivot axis 108 can also be understood to be defined by the centroid points of the rear spherical joints 117 and 118. The rear hanger pivot axis 108 is therefore a fixed part of the geometry of the rear truck base block 123.

A rear hanger pivot axis angle 147 is the angle of the rear hanger pivot axis 108 relative to the plane of a riding surface 146 when the first rigid body 101 is not leaned and the fourth rigid body 104 is not steered.

The rear hanger pivot axis angle 147 controls the lean steering response of a rear truck assembly 150 such that when the rear hanger pivot axis angle 147 is steeper, typically in the range of 45 to 60 degrees, results in faster lean steering response of the rear wheels to the motion of the second rigid body 102. Likewise, when the rear hanger pivot axis angle 147 is lower, typically below 45 degrees, produces relatively slower lean steering response of the rear wheels to the motion of the second rigid body 102. Changing the angle of the rear hanger pivot axis 108 changes ride dynamics to increase or decrease the lean steering motion, or response. A higher angle produces a faster lean steering motion and a lower angle produces a slower lean steering motion.

Assembly of the front end of the first embodiment of the present disclosure requires installation of upper headset bearing components 130 and lower headset bearing components 131 to the fork steer tube 127 and the headtube 122 by means commonly in use. In a preferred embodiment, the fork steer tube 127 passes up through the lower headset bearing components 131, through the head tube 122, through the upper headset bearing components 130, and through an internal compression shim 136. Fork compression cap 137 sits on top internal compression shim 136. Fork compression bolt 138 passes down through fork compression cap 137 and threads into fork steer tube 127. Tightening torque to fork compression bolt 138 controls the headset bearing preload adjustment and completes connection of the first rigid body 101 with the second rigid body 102 by means of the first revolute joint 112. The handlebar 125 passes down through riser clamp 135 to contain the internal compression shim 136. Tightening torque to riser clamp bolts 139 compresses the handlebar riser 125, the internal compression shim 136 and the fork steer tube 127 to fix the position of the handlebar riser 125 and the handlebar 124 relative to the fork 126 and the steer tube 127 and locks the preload adjustment of the upper and lower headset bearing components 130 and 131. This completes assembly and connection of the first rigid body 101 with the second rigid body 102 by means of the first revolute joint 112 that defines the front twist steering axis 106.

In a preferred embodiment, further assembly has the fork axle shaft 132 with threaded end 140 pass through front hanger bearing 133a, through central pivot bore 141 of front hanger 128, and through front hanger bearing 133b. Lock nut 134 threads onto fork axle shaft threads 140. Tightening torque on lock nut 134 controls front hanger bearing adjustment and completes connection of the second rigid body 102 with the third rigid body 103 by means of the second revolute joint 113 that defines the front hanger pivot axis 107.

FIG. 6 shows a front virtual pivot point 109 that is formed at the intersection of the front axle axis 114, the front hanger pivot axis 107, and the front twist steering axis 106.

Figure 8:
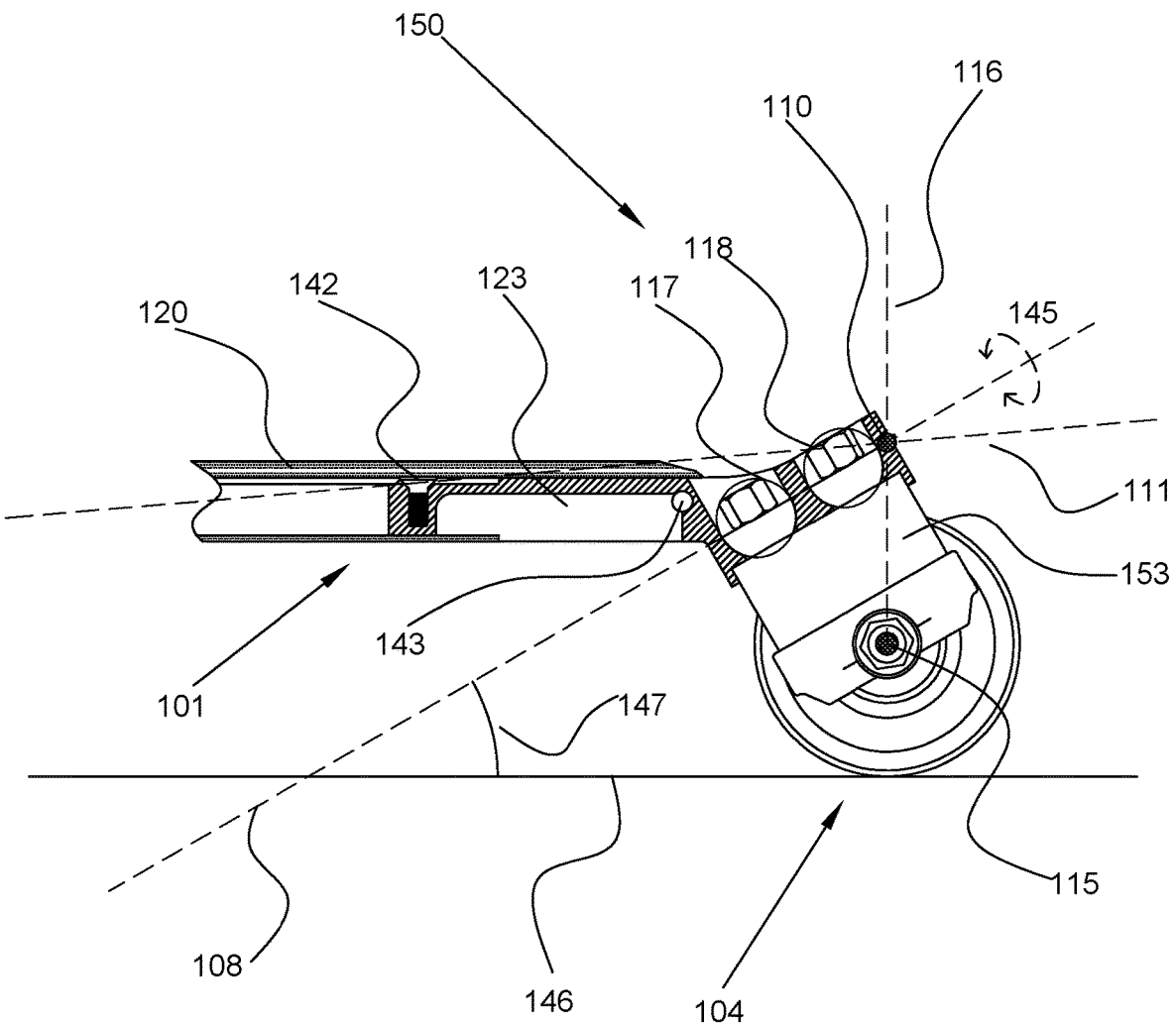
FIG. 8 shows a side section kinematic diagram of rear truck assembly of the first embodiment of the present disclosure.

FIGS. 8 and 9 show the rear truck assembly 150. The rear truck assembly 150 is part of the lean steering motion, and may be used with any of the previous embodiments. The rear truck assembly 150 is comprised of the rear truck base block 123, elastomeric component 153, the fourth rigid body 104, and the third revolute joint connecting the first rigid body 101 with the fourth rigid body 104.

Elastomeric component 153 constrains the rotation of the first rigid body 101 relative to the fourth rigid body 104 about the rear hanger pivot axis 108 providing both suspension and return to center force. Elastomeric component 153 further transfers torque about the rear hanger pivot axis 108 between the first rigid body 101 and the fourth rigid body 104. The suspension, return to center, and torque functions of elastomeric component 153 may be achieved by any means known in the art.

A rear axle axis 115 is defined by and concentric with rear axle 159. The rear hanger pivot axis 108 is defined by the two centroid points of hemispheric bearings 155a and 155b.

A rear virtual pivot 110 is formed at the intersection of the rear hanger pivot axis 108 and a vertical line 116 projecting vertically up from the center of the rear hanger axle axis 115.

A longitudinal roll axis 111 is defined by front virtual pivot 109 and rear virtual pivot 110.

In a preferred embodiment, the rear (lean steering) truck assembly 150 of a first embodiment of the present disclosure has the rear truck base block 123 connected with deck 120 secured by top screws 142 and rear truck base block lateral bolt 143 and rear truck base block lateral bolt lock nut 144. Further assembly has rear hanger pivot bolts 152a and 152b of the rear hanger 157 pass up through pass through bores 149a and 149b of elastomeric component 153, through hemispheric bearing surfaces 154a and 154b of the rear truck base block 123, and through hemispheric bearings 155a and 155b. Pivot bolt lock nuts 156a and 156b thread onto rear hanger pivot bolts 152a and 152b to complete assembly of the rear (lean steering) truck assembly 150.

Tightening or loosening of pivot bolt lock nuts 156a and 156b controls the preload of elastomeric component 153 now sandwiched between the rear truck base block 123 and the rear hanger 157.

The unique kinematic design of embodiments of the present disclosure allows the unique motion of universal rotation of front hanger 128 and attached front wheels 160 about the front hanger pivot axis 107.

Twisting of the handlebars is the rider input that directly steers front hanger 128 and front wheels 160 wherein the universal motion of front hanger 128 and front wheels 160 about the front hanger pivot axis 107 provides consistent front steering even during extreme articulation of front hanger 128 and front wheels 160 about the front hanger pivot axis 107. The shape and provided clearance of components like front fork 126, neck 121, or deck 120 ensure front hanger 128 and front wheels 160 may not contact fixed surfaces of the riding device. Consequently, all combinations of front twist steering and universal rotation are available without the safety hazards of loss of steering, loss of stability or unwanted deceleration as may happen if unwanted contact between spinning wheels 160 and other rigid bodies of the riding device were possible.

Leaning of the deck and handlebar side to side is the rider input that rotates the riding device about the longitudinal roll axis thereby rotating the hanger pivot axis to produce a corresponding steering geometry for the rear (lean steering) truck assembly 150.

The kinematic design of the present disclosure provides that the motions of twist steering of the front wheels and lean steering of the rear wheels are independent one from the other such that the front wheels may be steered right or left at the same time and without interference from lean steering of the rear wheels and vice versa, the rear wheels may be steered right or left at the same time and without interference from twist steering of the front wheels. This form of independent twist steering of the front wheels and lean steering of the rear wheels shall be named and is defined herein as "hybrid steering technology."

All embodiments of the present disclosure utilize hybrid steering technology and have front fork and frame designs that allow the motion of universal rotation of a front hanger about a front hanger pivot axis which in turn allows the utilization of narrow front wheel tracks.

Figure 10:
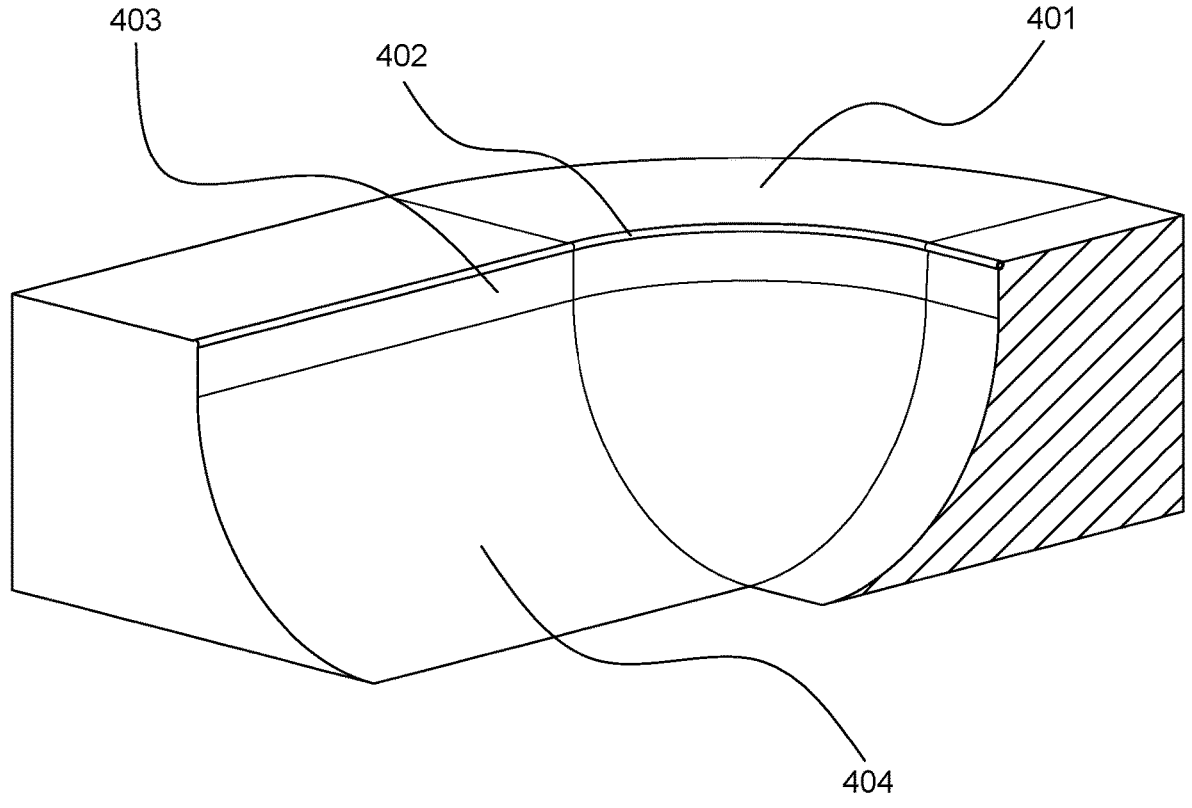
FIG. 10 shows a section view of a typical skateboard park with a horizontal surface, coping, a vertical surface, and a curved transition surface.
Figure 11:
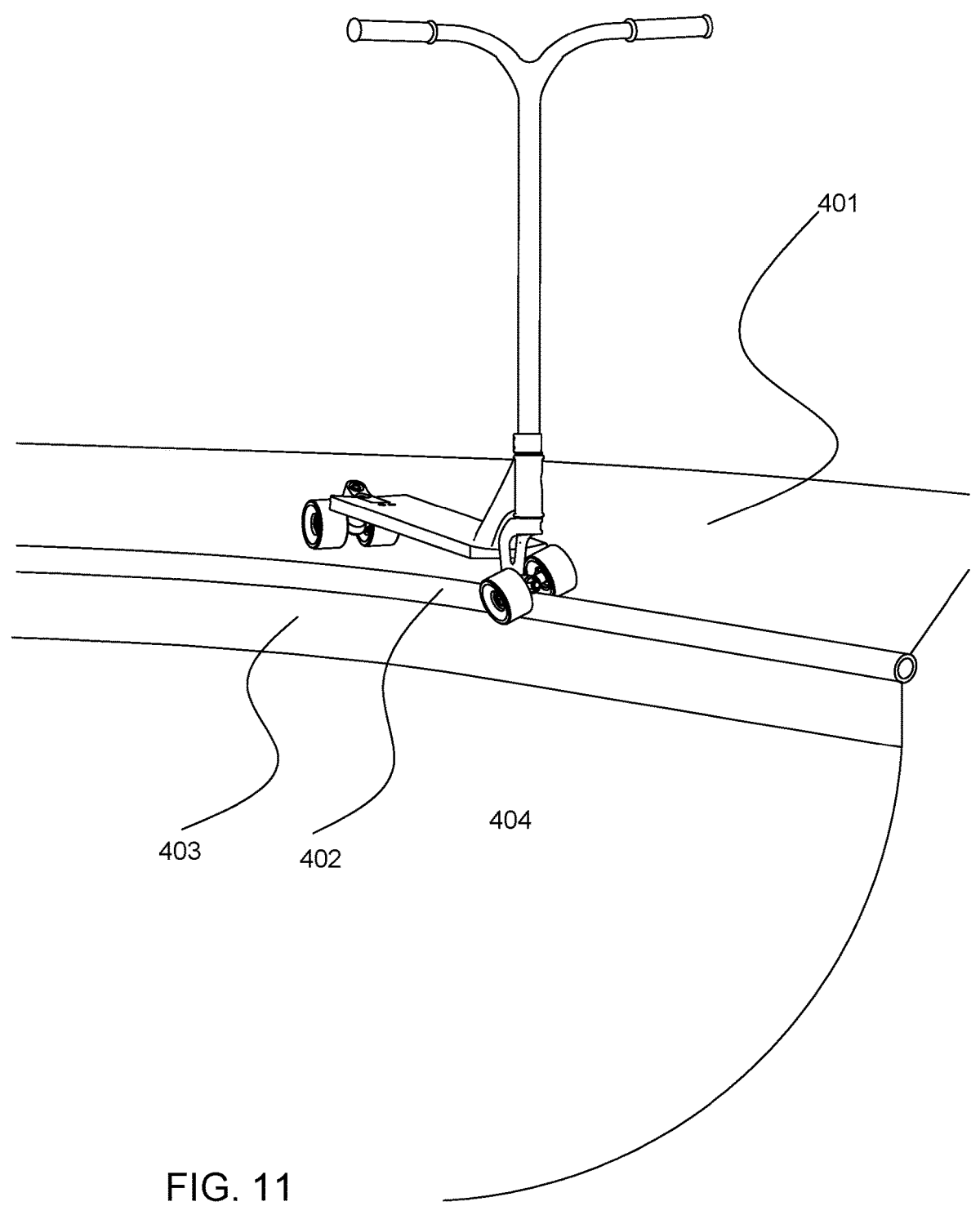
Figure 12:
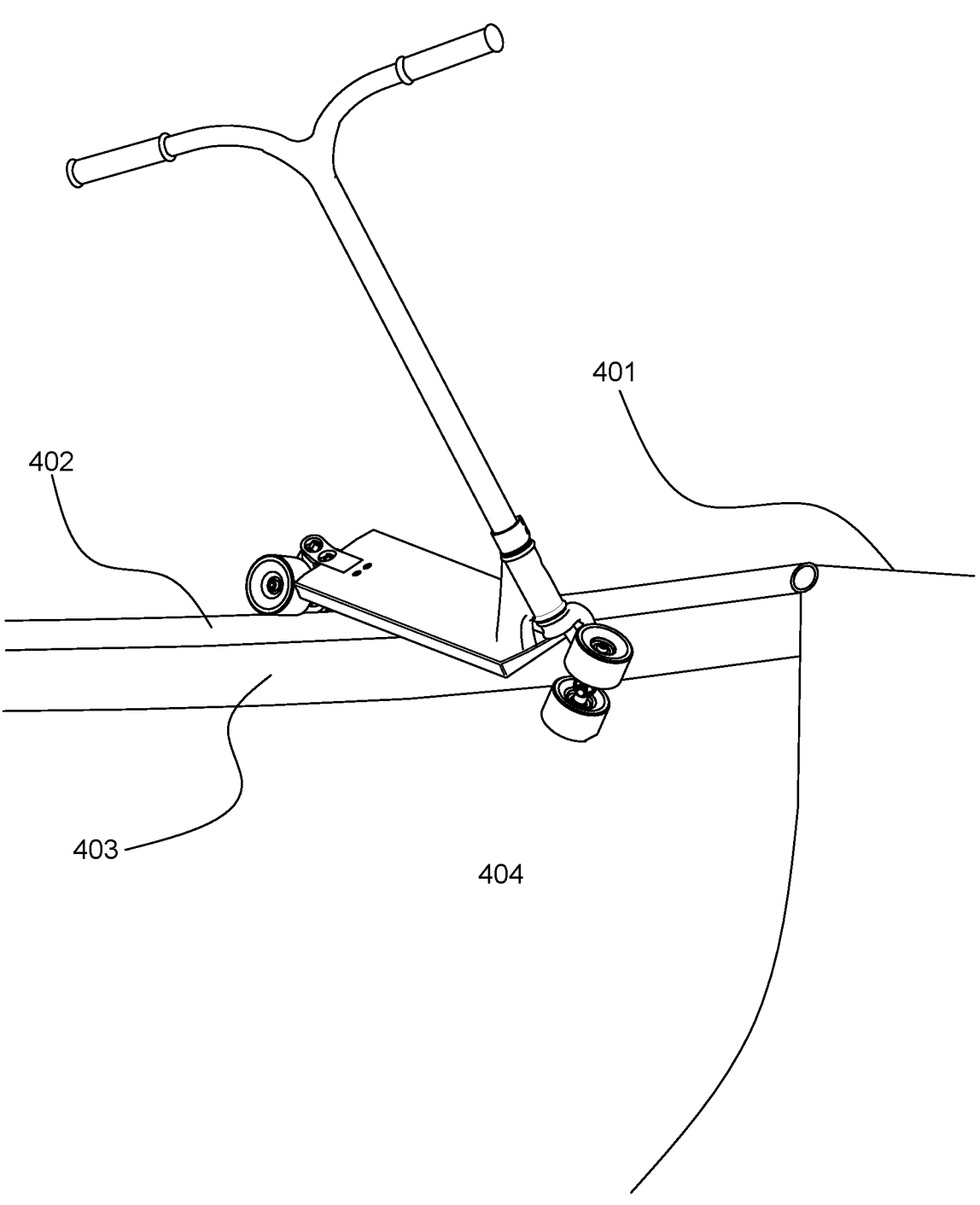
FIG. 12 shows a view of the of the present disclosure with the rear wheels riding on the horizontal surface of a skateboard park with the front hanger and front wheels coming off the coping of the skateboard park and turning down onto the vertical surface of a skateboard park.
Figure 13:
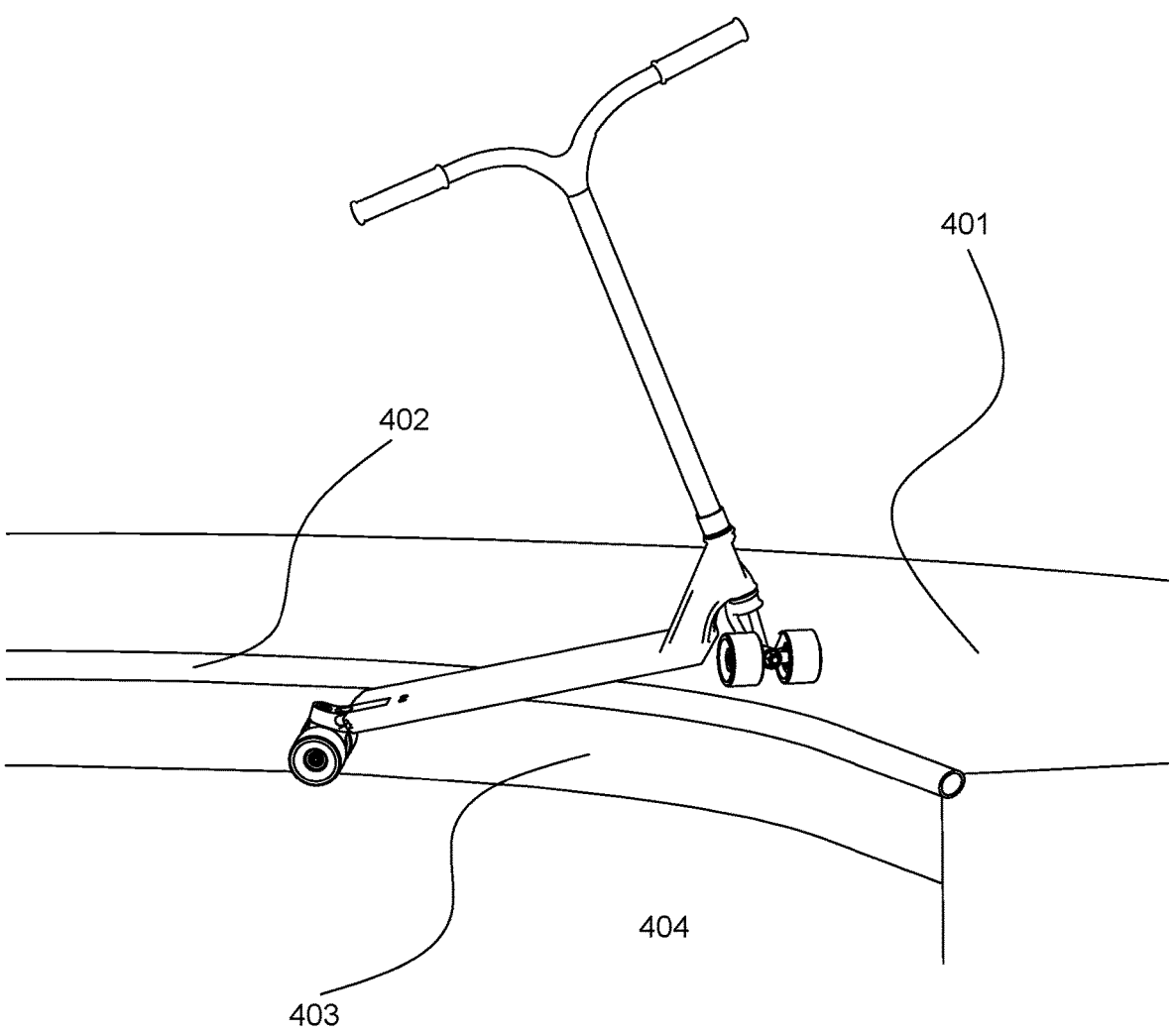
FIG. 13 shows the truck and rear wheels of the present disclosure hanging in the air with the bottom of the deck sliding on coping with the front hanger and front wheels riding on the horizontal surface of a skateboard park.
Figure 14:
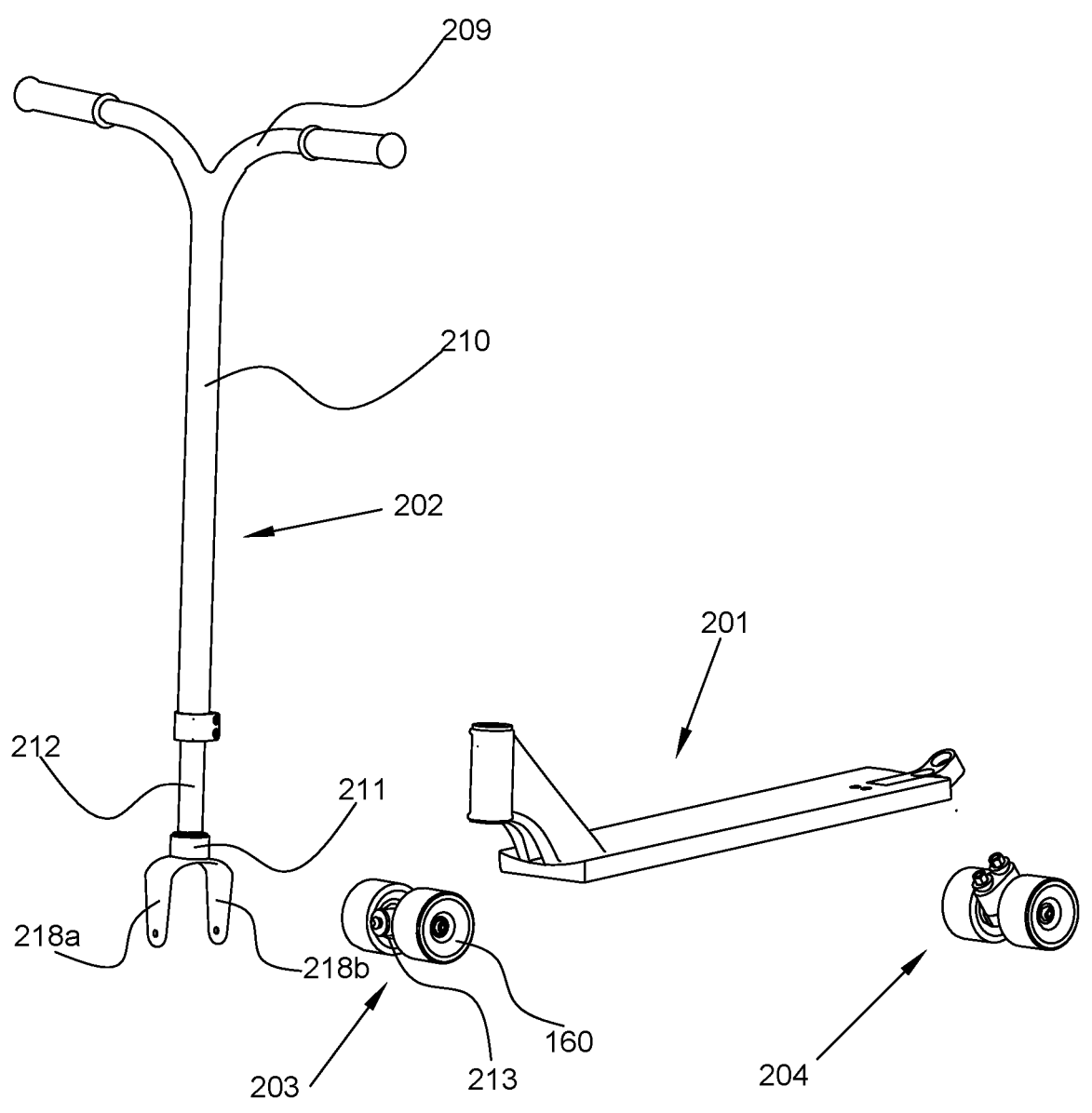
FIG. 14 shows an exploded view of the rigid bodies of a second embodiment of the present disclosure.
Figure 15:
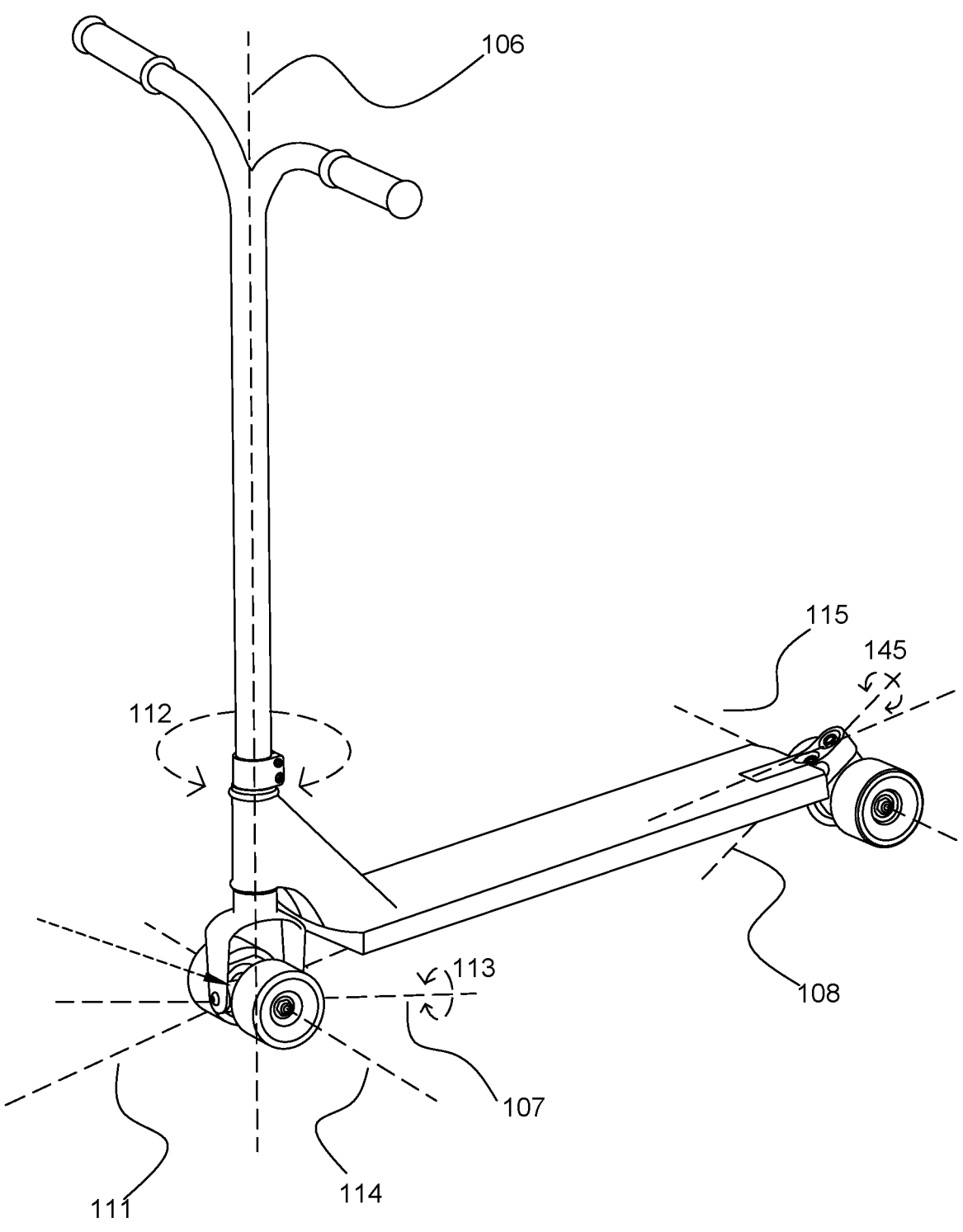
FIG. 15 shows an assembled perspective view of the second embodiment of the present disclosure with the major kinematic axes of rotation.

FIGS. 11-13 is one example showing that universal rotation combined with a narrow front wheel track allows front wheels 160 to maintain consistent contact with the riding surface thus providing improved control and stability and accurate front steering when riding across steeply banked surfaces, ledges, curbs, uneven terrain, and the like, or when on riding surfaces 401, 402, 403, or 404 as shown in FIG. 10.

FIGS. 14-17 show the second embodiment of the present disclosure. The second embodiment shares the same kinematic design, kinetics, and ride dynamics as the first embodiment. The second embodiment is likewise comprised of four rigid bodies. The first rigid body 201 is the same as the first rigid body 101 of the first embodiment. Likewise, fourth rigid body 204 of the second embodiment is shown to be the same as the fourth rigid body 104 of the first embodiment. A second rigid body 202 is a clamped, welded, or bolted together assembly comprised of handlebar 209, handlebar riser 210, a fork 211 with a first fork leg 218a and a second fork let 218b and fork steer tube 212. A third rigid body 203 is comprised of front hanger 213 that supports two laterally spaced front wheels 160.

FIGS. 14-17 show that assembly and connection between rigid bodies 201 and 202 is the same as the first embodiment. As well, the assembly and connection between rigid bodies 201 and 204 are the same as the first embodiment. As with the first embodiment, it is apparent that these assemblies may be formed by any means known in the art.

The fork 211 of the second embodiment has an upside-down U-shape. The fork 211 comprises a first fork leg 218a and a second fork leg 218b projecting downward. First fork leg 218a and second fork leg 218b contain and support front hanger pivot bolt 219 and hanger 213. Front hanger pivot bolt 219 is coincident with the front hanger pivot axis 107. The front hanger 213 universally rotates around the front hanger pivot bolt at the second revolute joint for universal rotation of the second rigid body and the connected front wheels around the front hanger pivot axis.

In a preferred embodiment, front hanger pivot bolt 219 with threaded end 221 passes from the outside of fork leg 218a, through front hanger bearing 227a, through the central pivot bore of front hanger 213, through front hanger bearing 227b, and out through fork leg 218b. Hanger pivot bolt lock nut 220 threads onto threaded end 221 of hanger pivot bolt 219 to complete the assembly.

The shape of the fork 211, first fork leg 218a, and second fork leg 218b allows for universal rotation of the second rigid body and connected front wheels.

Figure 16:
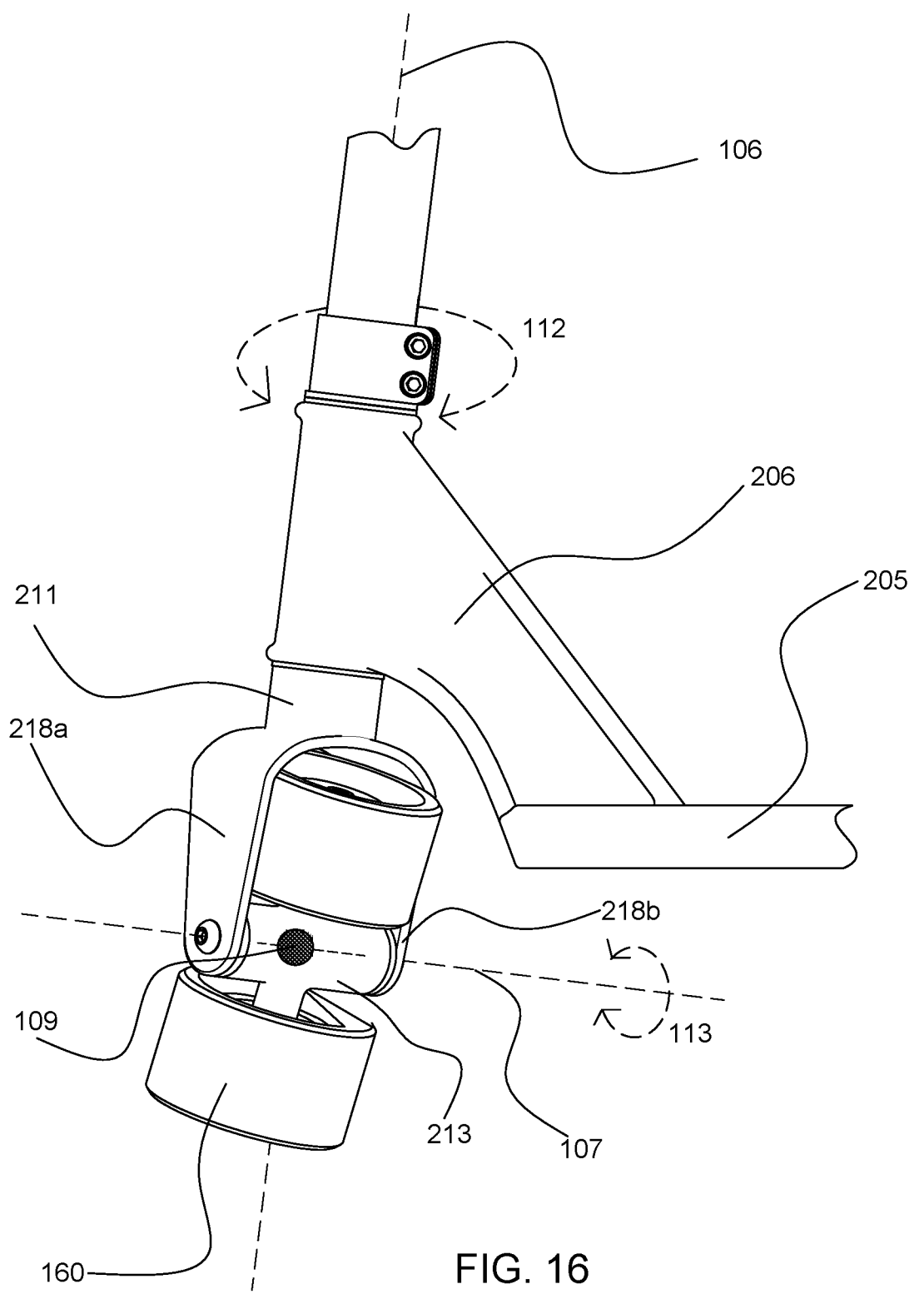
FIG. 16 shows a side view of the second embodiment of the present disclosure with front hanger and front wheels rotated within the clearance of front fork with fork legs and to illustrate the motion of universal rotation of front hanger and front wheels about front hanger pivot axis.
Figure 17:
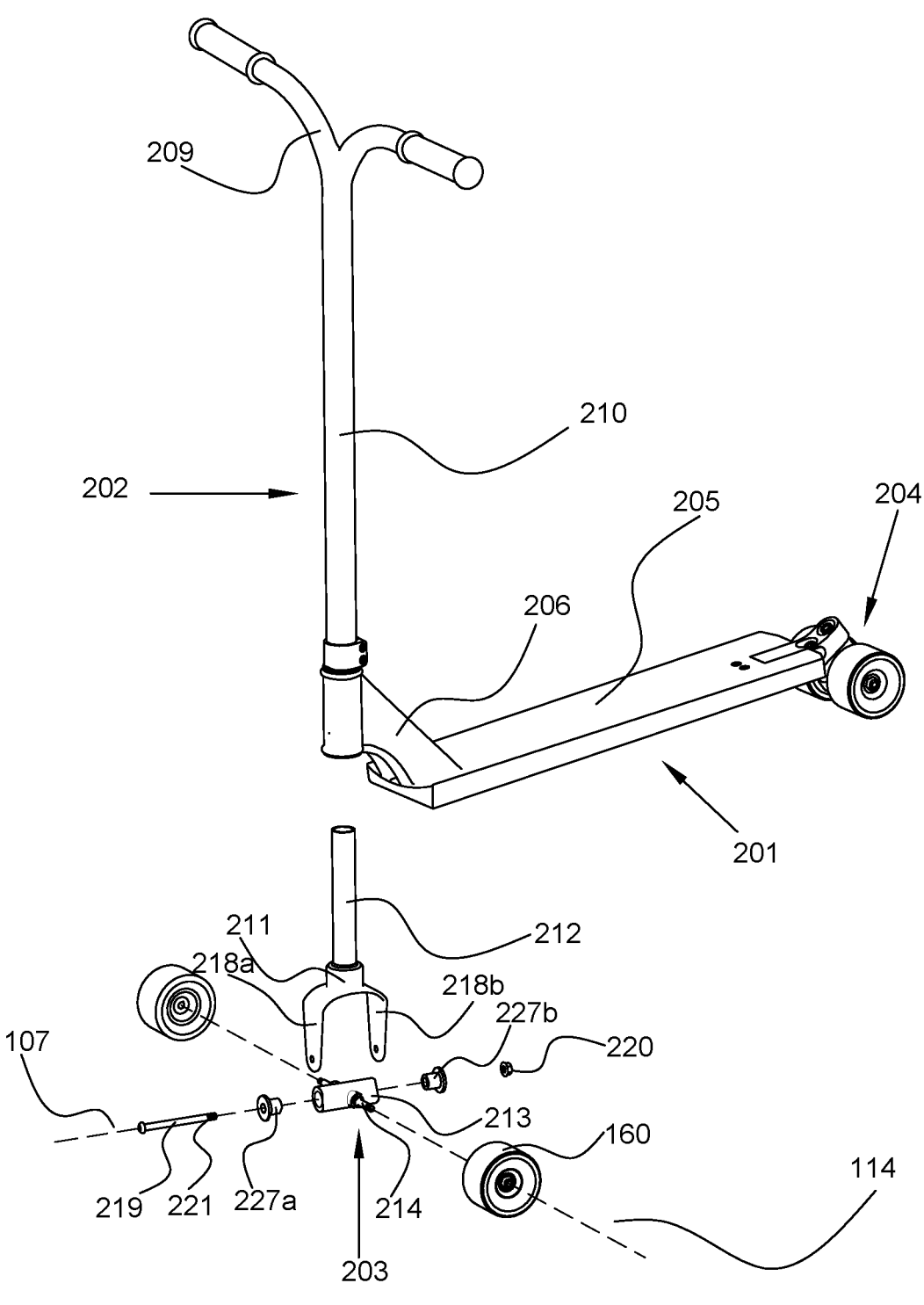
FIG. 17 shows an exploded view of the second embodiment of the disclosure.
Figure 18:
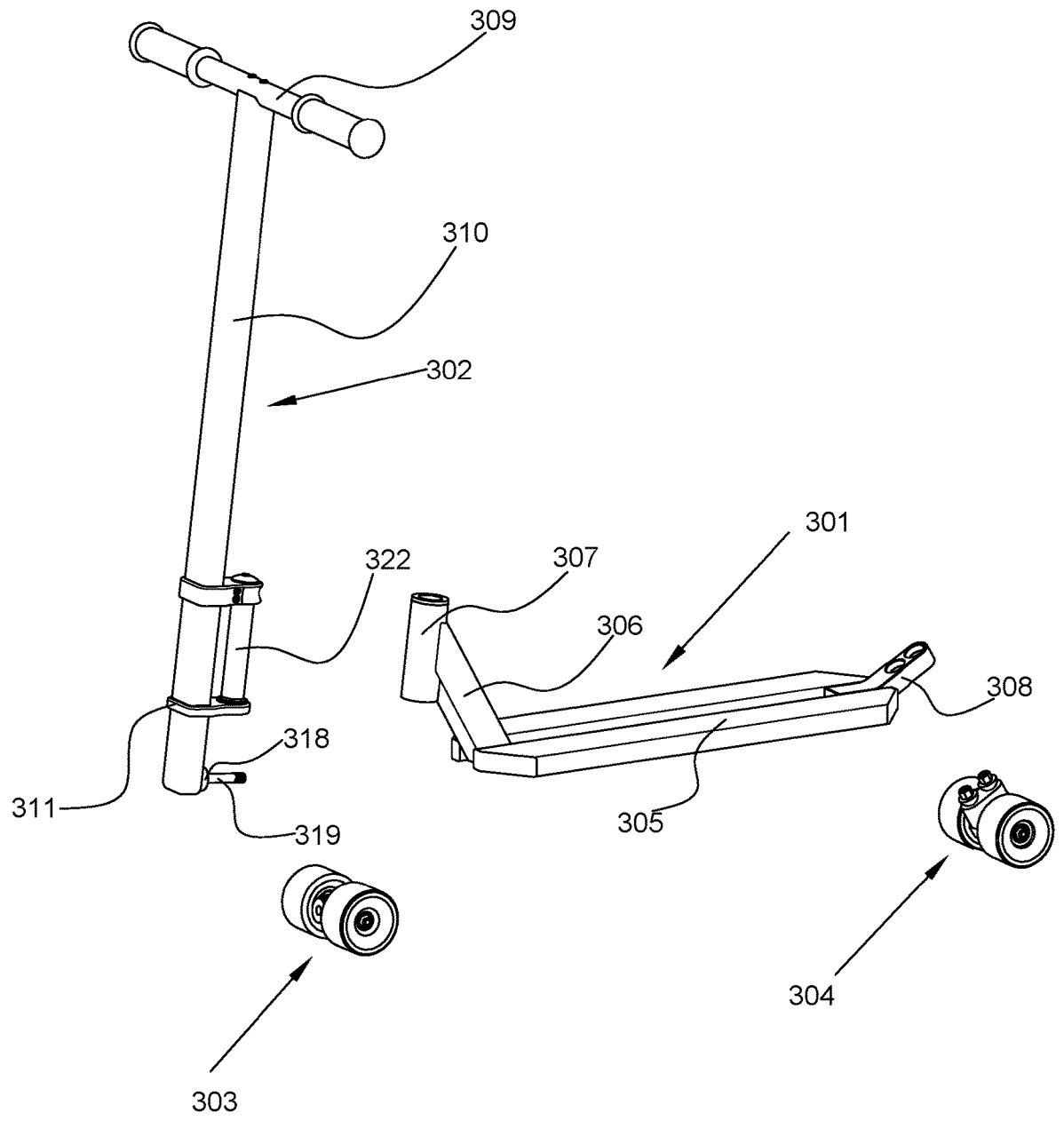
FIG. 18 shows an exploded view of the rigid bodies of a third embodiment of the present disclosure.
Figure 19:
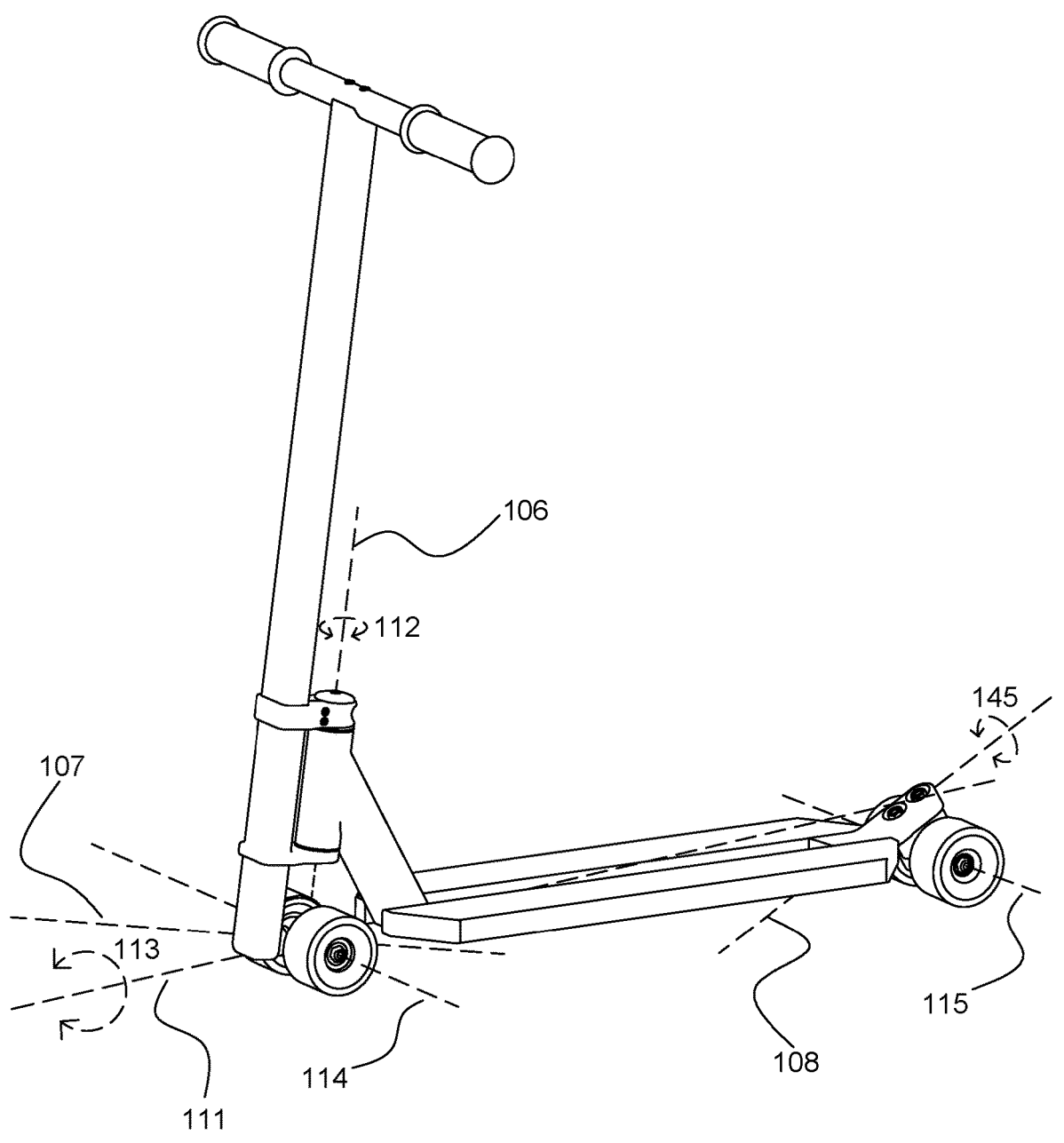
FIG. 19 shows an assembled perspective view of the third embodiment of the present disclosure with the major kinematic axes of rotation.
Figure 20:
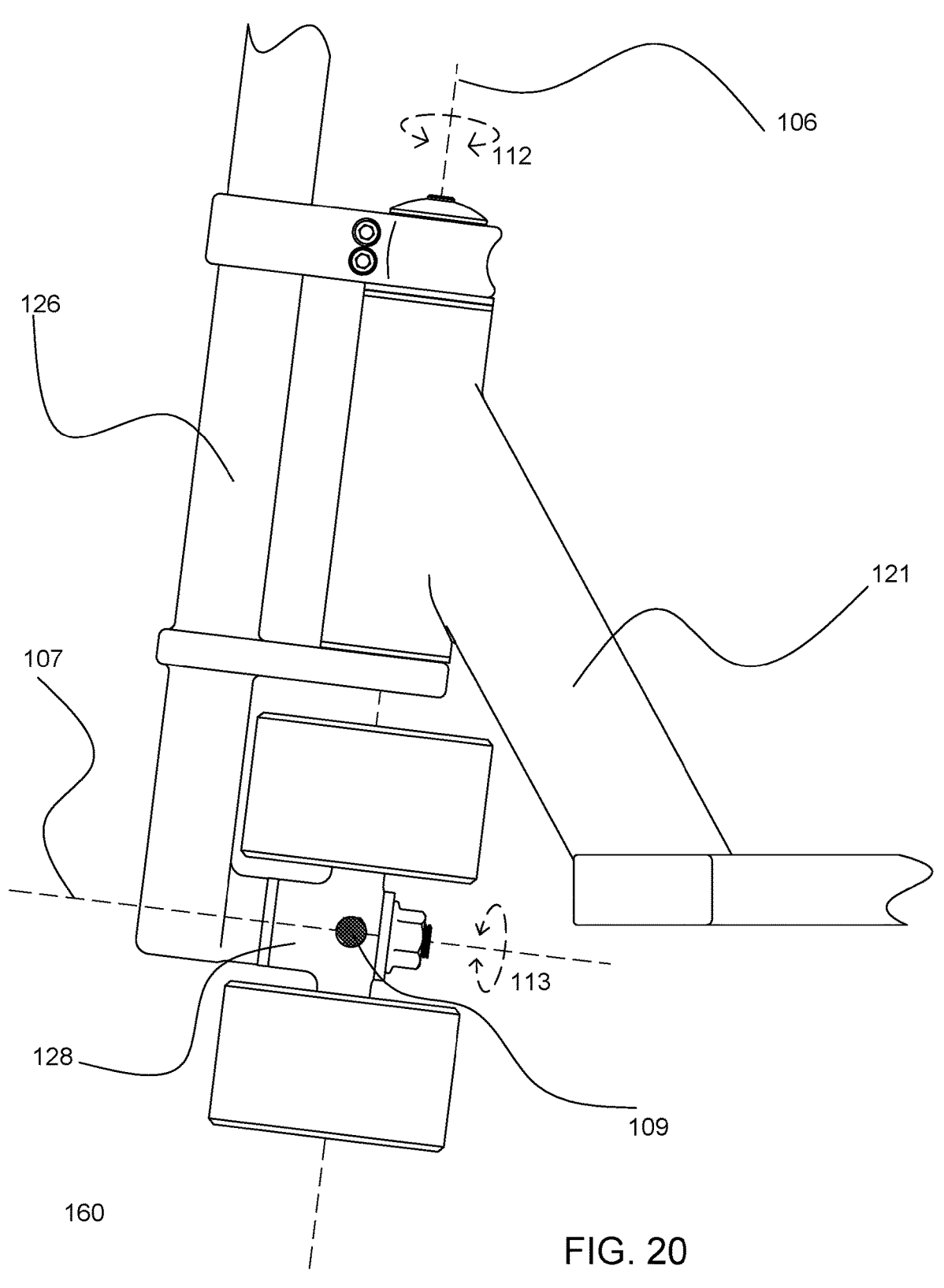
FIG. 20 shows a side view of the third embodiment of the present disclosure with the front hanger and front wheels rotated within the clearance of front fork and neck to illustrate the motion of universal rotation of front hanger and front wheels about front hanger pivot axis.

The front wheels may universally rotate between the fork legs and around the hanger pivot axis, as shown in FIG. 16. This is the same motion of universal rotation of the front hanger and front wheels about the front hanger pivot axis 107 as described in the first embodiment. Wheels 160 do not contact any part of the fork 211 or fork legs 218a and 218b.

Likewise, the shape of neck 206 and deck 205 allow clearance for the motion of universal rotation during all combinations of front twist steering and universal rotation of front hanger 213 and wheels 160 such that wheels 160 may not touch any part of neck 206 or deck 205.

FIGS. 18-21 show the third embodiment of the present disclosure. The third embodiment shares the same kinematic design, kinetics, and similar ride dynamics as the first embodiment and second embodiment. The third embodiment is likewise comprised of four rigid bodies. A first rigid body 301 is a clamped, welded, or bolted together assembly comprised of a deck 305, a neck 306, a headtube 307, and rear truck rear truck base block 308.

As compared to certain scooters that have a fork and fork steer tube that are first independent of and then connected to a riser 125, in the third embodiment, an integrated riser and fork 310 is provided with the steer tube 322.

Figure 21:
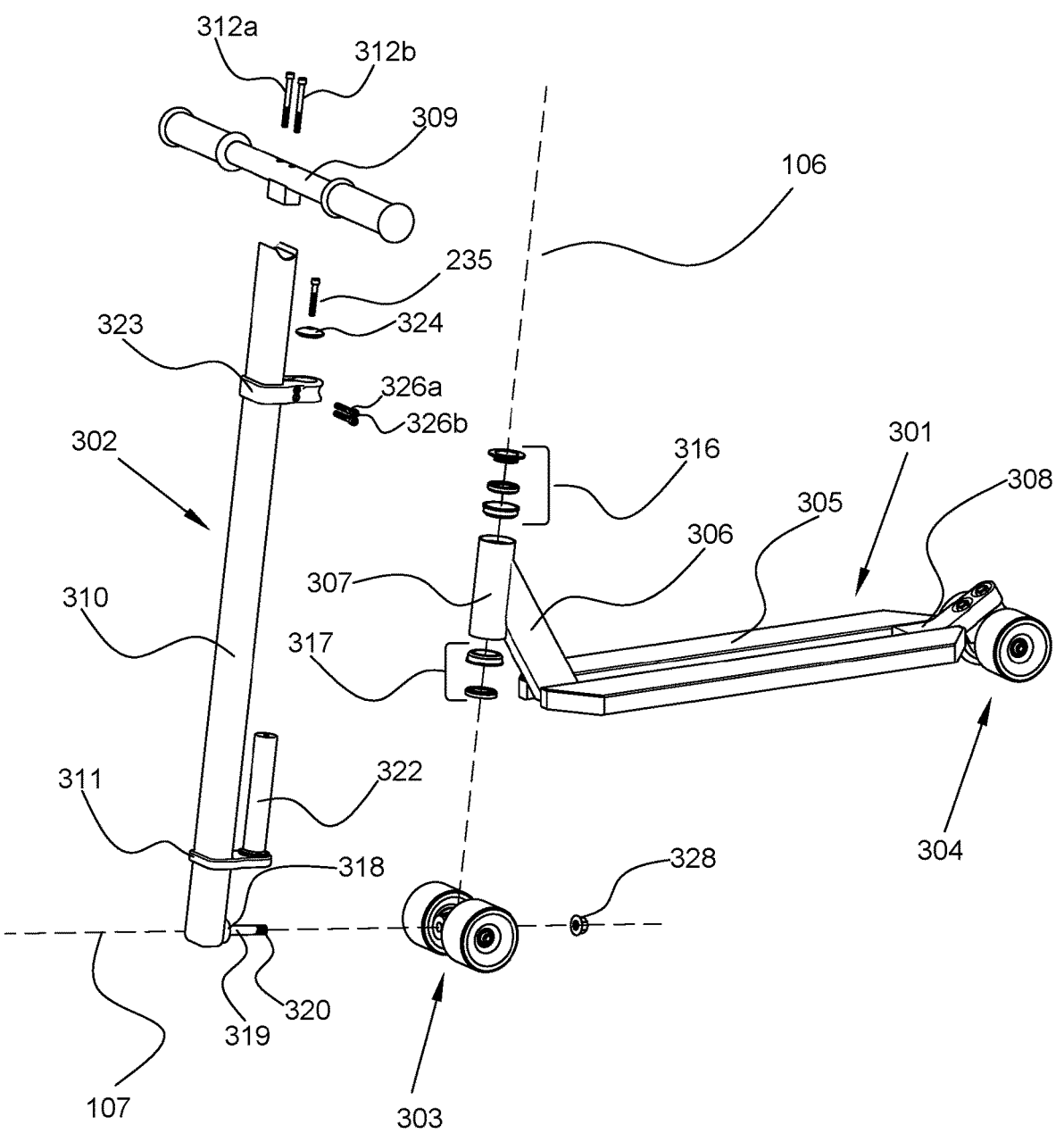
FIG. 21 shows an exploded view of the third embodiment of the present disclosure.

A second rigid body 302 is a clamped, welded or bolted together assembly comprised of handlebar 309, integrated riser and fork 310, steer tube base 311, the steer tube 322, fork axle boss 318, cantilevered axle 319 with threaded end 320. Steer tube base 311 projects rearward from the integrated riser and fork 310 and supports the steer tube 322. The cantilevered axle 319 is connected with the integrated riser and fork 310 and projects rearward from the integrated riser and fork 310. The cantilevered axle is coincident with the front hanger pivot axis 107. The cantilevered axle is underneath the steer tube base near the bottom of the integrated riser and fork 310. The fork axle boss and cantilevered axle are at or near the bottom of the integrated riser and fork, as shown in FIG. 21. The cantilevered axle is coincident with the front hanger pivot axis 107. The steer tube 322 has a rearward offset from integrated riser and fork 310, as shown in the FIGS. 18-21. The steer tube 322 has a rearward offset from integrated riser and fork 310 and is supported by rearward projecting steer tube base 311, as shown in the FIGS. 18-21.

A third rigid body 303 comprising a front hanger assembly comprising a hanger and at least one axle, wherein the axle connects with two laterally spaced front wheels.

A fourth rigid body 304 comprises a rear hanger assembly comprising a hanger, at least one rear hanger pivot bolt, and at least one axle, wherein the axle connects with two laterally spaced rear wheels, and is the same as rear hanger rigid body 104 in the first embodiment.

FIGS. 18-21 show the design, assembly, and connection of rigid body 301, with rigid body 302 of the third embodiment is different than the first and second embodiments. The design is different in that integrated riser and fork 310 functions as both riser and a fork to support the steer tube 322. A sliding compression clamp 323 contains the upper portion of the steer tube 322 when assembled.

In a preferred embodiment, assembly of rigid body 301 and 302 requires installation of upper and lower headset bearing components 316 and 317 respectively within the headtube 307 in the conventional manner. The steer tube 322 passes up through lower headset bearing components 317 through the head tube 307, and through upper headset bearing components 316. Sliding compression clamp 323 slides down integrated riser and fork 310 to contain the upper portion of the steer tube 322. Headset cap 324 is fitted to the top of sliding compression clamp 323 and is secured by headset preload bolt 325 that threads into the top of the steer tube 322. Tightening torque on headset preload bolt 325 provides axial compression of the headset bearing assemblies 316 and 317. Tightening compression clamp bolts 326 secures integrated riser and fork 310 and the steer tube 322 to fix headset adjustment and complete assembly and connection of rigid body 301 with rigid body 302. Handlebar 309 is fitted to the top of riser and fork 310 and secured by handlebar bolts 312.

Rigid body 301 and rigid body 302 are connected by means of the first revolute joint 112 with concentric front twist steering axis 106 in the form of a headset bearing and clamp assembly as described above or by other means as known in the art.

The front twist steering axis 106 is defined by and coaxially aligned with the steer tube 322, the head tube 307 and headset bearings assemblies 316 and 317.

The rearward offset of the steer tube 322 from integrated riser fork tube 310 provides a steering-limit by means of contact between integrated riser fork tube 310 and neck 306. The front twist steering-limit puts a constraint the degree of twist steering in this embodiment. The presence of a front twist steering-limit on the third embodiment differentiates it from the unconstrained front twist steering of the first and second embodiments of the present disclosure.

Assembly and connection of rigid body 302 with rigid body 303 is the same as with the first embodiment and secured by lock nut 134.

Assembly and connection of rigid body 301 with rigid body 304 is the same as with the first embodiment.

Figure 22:
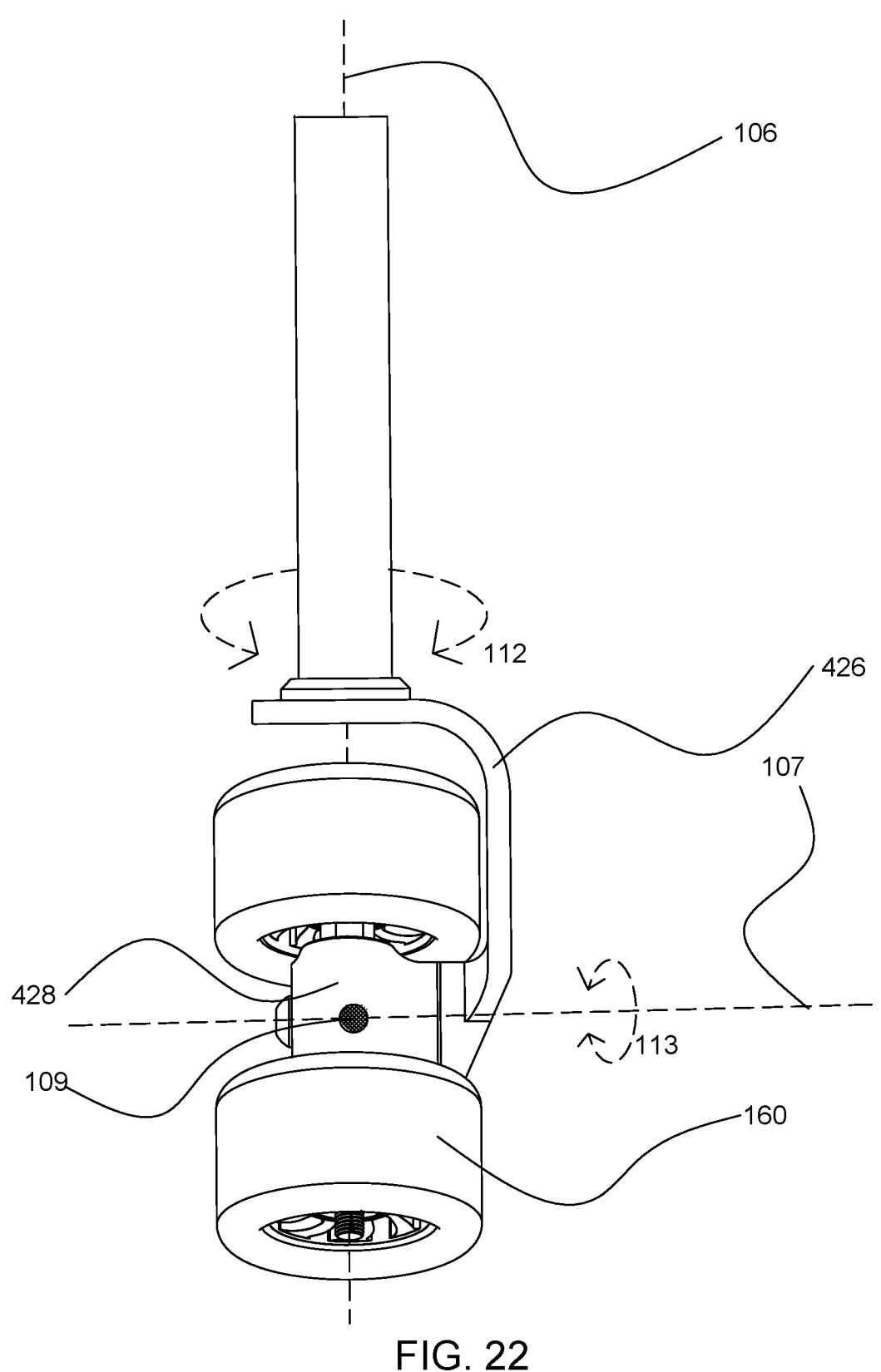
FIG. 22 shows a side view of the fourth embodiment of the present disclosure with the front hanger and front wheels rotated within the clearance of front fork to illustrate the motion of universal rotation of front hanger and front wheels about front hanger pivot axis.
Figure 23:
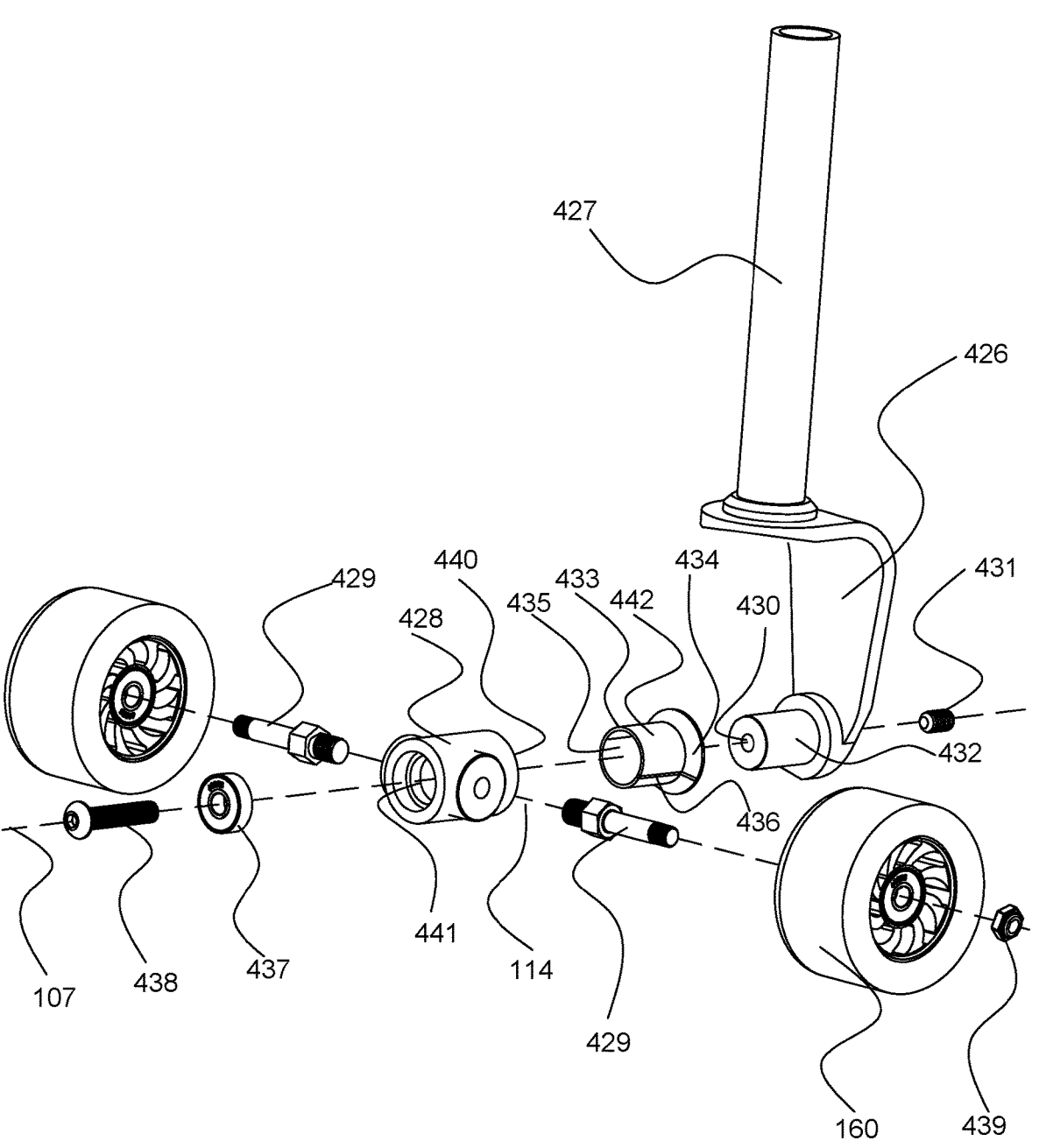
FIG. 23 shows an exploded perspective view of the fourth embodiment of the present disclosure with an alternative method of connecting front hanger to front fork.

FIGS. 22-23 show the fork and hanger assembly of the fourth embodiment of the present disclosure. The fourth embodiment shares the same kinematic design, kinetics, and similar ride dynamics as the first, second, and third embodiments. The device has a first rigid body comprising a deck, a neck, a headtube, and a rear truck base block; a second rigid body comprising a handlebar, a riser, a fork, and a fork steer tube; a third rigid body comprising a front hanger assembly comprising a hanger and at least one axle, wherein the axle connects with two laterally spaced front wheels; a fourth rigid body comprising a rear hanger assembly comprising a hanger, at least one rear hanger pivot bolt, and at least one axle, wherein the axle connects with two laterally spaced rear wheels; a rear truck assembly comprising the rear truck base block, an elastomeric component, the fourth rigid body, and a third revolute joint; a first revolute joint connecting the first rigid body with the second rigid body, wherein the first revolute joint revolves around a front twist steering axis for a twist steering motion of the front wheels; a second revolute joint with universal rotation connecting the second rigid body with the third rigid body, wherein the third rigid body and the connected front wheels may universally rotate around a front hanger pivot axis; the third revolute joint connecting the first rigid body with the fourth rigid body, wherein the third revolute joint comprises a constrained first rear spherical joint and a constrained second rear spherical joint, and wherein the first spherical joint and the second spherical joints rotate in constrained unison about the rear hanger pivot axis producing a lean steering motion of the rear wheels; wherein the twist steering motion of the front wheels is independent of a lean-steering motion of the rear wheels.

FIGS. 22-23 show a fork 426 connected to a front hanger 428 through a second revolute joint (hanger revolute joint) 113. In a preferred embodiment, the second revolute joint 113 is comprised of a fork axle boss 432 with threaded bore 430, a front hanger compression bearing 433 with an angular thrust surface 434, an interior radial bearing surface 435, an exterior bearing surface 442, along with a compression slot 436, a retaining bolt 438, and a locking set screw 431. As with other embodiments of the present disclosure, the fork 426 has a shape that allows 360-degree rotation of the front hanger 428 and attached front wheels 160 about the front hanger pivot axis 107 such that front wheels 160 do not contact any part of fork 426.

The front fork 426 preferably has a C-shape with a top of the C-shape connected with the fork steer tube and a bottom of the C-shape connected with a fork axle boss. The fork axle boss 432 is coincident with the front hanger pivot axis. The front hanger universally rotates around the fork axle boss at the second revolute joint for universal rotation of the second rigid body and the connected front wheels around the front hanger pivot axis. Thus, the front hanger may rotate 360 degrees, or more, around the front fork axle shaft for universal rotation of the second rigid body and the connected front wheels around the front hanger pivot axis so that the wheels do not contact any part of the riding device.

A preferred embodiment assembly of fork 426 and hanger 428 comprises front hanger compression bearing 433 sliding onto fork axle boss 432. Hanger 428 then slides onto hanger compression bearing 433. Bearing 437 is press fit within hanger recess 441. Retaining bolt 438 passes through bearing 437 and threads into fork threaded bore 430.

Retaining bolt 438 controls the speed and resistance of rotation of the front hanger about the front hanger pivot axis.

Tightening retaining bolt 438 compresses hanger compression bearing 433 angled thrust surface 434 between hanger 428 interior thrust surface 440 (not shown) and fork 426. Under compression, hanger compression bearing slot 436 narrows to allow internal radial bearing surface 435 to squeeze fork axle boss 432 thereby reducing the tolerance stack between hanger internal thrust surface 440, compression bearing 433 angled thrust surface 434, internal radial bearing surface 435 and fork axle boss 432. By tightening the retaining bolt 438, the motion of universal rotation of the hanger 428 about the front hanger pivot axis 107 may be adjusted to create a slow and dampened motion of universal rotation. Set screw 431 threads into fork threaded bore 430 and bottoms out on the end of retaining bolt 438 to lock adjustment.

The above specification presents the best mode contemplated in carrying out the disclosure(s) described herein. However, the specification is susceptible to alternate constructions from the embodiments shown in the FIGS. and accompanying description. Consequently, it is not intended that the disclosure be limited to the particular embodiments disclosed. On the contrary, the disclosure is intended to cover all modifications, sizes and alternate constructions falling within the spirit and scope of embodiments of the disclosure.

What is claimed is:

1. A riding device for riding on a riding surface, comprising:

a first rigid body comprising a deck, a neck, a headtube, and a rear truck base block with a rear pivot axis;

a second rigid body comprising a handlebar, a riser, a fork steer tube, a front fork with a front hanger pivot axis, and a front virtual pivot point;

a third rigid body comprising a front hanger assembly comprising a front hanger and at least one axle, wherein the axle connects with two laterally spaced front wheels;

a fourth rigid body comprising a rear hanger assembly comprising a rear hanger, at least one rear hanger pivot bolt, a rear virtual pivot point, and at least one axle, wherein the axle connects with two laterally spaced rear wheels;

a rear truck assembly comprising the rear truck base block, an elastomeric component, the fourth rigid body, and a third revolute joint;

a first revolute joint connecting the first rigid body with the second rigid body, wherein the first revolute joint revolves around a front twist steering axis for a twist steering motion of the front wheels;

a second revolute joint with universal rotation connecting the second rigid body with the third rigid body, wherein the third rigid body and the connected front wheels universally rotate around the front hanger pivot axis;

the third revolute joint connecting the first rigid body with the fourth rigid body, wherein the third revolute joint comprises a constrained first rear spherical joint and a constrained second rear spherical joint, wherein the first spherical joint and the second spherical joints rotate in constrained unison about a rear hanger pivot axis for a lean steering motion of the rear wheels, and wherein the twist steering motion of the front wheels is independent of the lean steering motion of the rear wheels; and a longitudinal roll axis along a virtual line between the front virtual pivot point and the rear virtual pivot point, wherein the first rigid body rotates about the longitudinal roll axis.

2. The riding device of claim 1, wherein the fork has a shape that allows the front hanger and laterally spaced front wheels to universally rotate around the front hanger pivot axis.

3. The riding device of claim 1, wherein the rear hanger pivot axis has an angle relative to the riding surface, wherein an increase in the angle increases the lean steering motion.

4. The riding device of claim 1, wherein the rear hanger pivot axis has an angle relative to the riding surface, wherein a decrease in the angle decreases the lean steering motion.

5. The riding device of claim 1, wherein the fork comprises a C-shape with a top of the C-shape connected with the fork steer tube and a bottom of the C-shape connected with a front fork axle shaft that is coincident with the front hanger pivot axis, and the front hanger universally rotates around the front fork axle shaft at the second revolute joint for universal rotation of the second rigid body and the connected front wheels around the front hanger pivot axis.

6. The riding device of claim 5, wherein the second revolute joint comprises the front hanger, the front fork axle shaft with a threaded end, front hanger bearings, and a retaining lock nut.

7. The riding device of claim 1, wherein the front fork comprises a C-shape with a top of the C-shape connected with the fork steer tube and a bottom of the C-shape connected with a fork axle boss that is coincident with the front hanger pivot axis, and the front hanger universally rotates around the fork axle boss at the second revolute joint for universal rotation of the second rigid body and the connected front wheels around the front hanger pivot axis.

8. The riding device of claim 7, wherein the second revolute joint comprises the front hanger, the fork axle boss with a threaded bore, a front hanger compression bearing with angular thrust surface, an interior radial bearing surface, an exterior bearing surface, a compression slot, a retaining bolt, and a locking set screw.

9. The riding device of claim 1, wherein the front fork comprises an upside-down U-shape with a first fork leg, a second fork leg, and a front hanger pivot bolt that is coincident with the front hanger pivot axis, wherein the front hanger pivot bolt passes through the first fork leg, through a central pivot bore of the front hanger, and through the second fork leg, wherein the front hanger universally rotates around the front hanger pivot bolt at the second revolute joint for universal rotation of the second rigid body and the connected front wheels around the front hanger pivot axis.

10. The riding device of claim 1, wherein adjusting the connection between the front fork and front hanger adjusts a tolerance stack of a bearing assembly connecting the fork to the front hanger assembly.

11. The riding device of claim 1, wherein the connection between the front fork and front hanger is configured to be adjusted to control the speed and resistance of rotation of the front hanger around the front hanger pivot axis.

12. A riding device for riding on a riding surface comprising:

a first rigid body comprising a deck, a neck, a headtube, and a rear truck base block with a rear pivot axis;

a second rigid body comprising a handlebar, an integrated riser and fork connected with a steer tube base, and a cantilevered axle that is coincident with a front hanger pivot axis, wherein the steer tube base projects rearward and is connected a steer tube with a rearward offset from the integrated riser and fork, and the cantilevered axle projects rearward from the integrated riser and fork and underneath the steer tube base;

a third rigid body comprising a front hanger assembly comprising a hanger and at least one axle, wherein the axle connects with two laterally spaced front wheels;

a fourth rigid body comprising a rear hanger assembly comprising a hanger, at least one rear hanger pivot bolt, and at least one axle, wherein the axle connects with two laterally spaced rear wheels;

a rear truck assembly comprising the rear truck base block, an elastomeric component, the fourth rigid body, and a third revolute joint;

a first revolute joint connecting the first rigid body with the second rigid body, wherein the first revolute joint revolves around a front twist steering axis for a twist steering motion of the front wheels;

a second revolute joint with universal rotation connecting the second rigid body with the third rigid body, wherein the third rigid body and the connected front wheels universally rotate around the front hanger pivot axis;

the third revolute joint connecting the first rigid body with the fourth rigid body, wherein the third revolute joint comprises a constrained first rear spherical joint and a constrained second rear spherical joint, wherein the first spherical joint and the second spherical joints rotate in constrained unison about a rear hanger pivot axis producing a lean steering motion of the rear wheels, and wherein the twist steering motion of the front wheels is independent of the lean steering motion of the rear wheels; and a longitudinal roll axis along a virtual line between a front virtual pivot point and a rear virtual pivot point, wherein the first rigid body rotates about the longitudinal roll axis.

13. The riding device of claim 12, wherein the cantilevered axle is coincident with the front hanger pivot axis, and the front hanger universally rotates around the cantilevered axle at the second revolute joint for universal rotation of the second rigid body and connected front wheels around the front hanger pivot axis.

14. The riding device of claim 12, wherein the integrated riser and fork is configured to contact a part of the first rigid body to constrain the range of front twist steering about a front steering axis.

15. The riding device of claim 12, wherein the rear hanger pivot axis has an angle relative to the riding surface, wherein an increase in the angle increases the lean steering motion.

16. The riding device of claim 12, wherein the rear hanger pivot axis has an angle relative to the riding surface, wherein a decrease in the angle decreases the lean steering motion.

17. The riding device of claim 12, wherein adjusting the connection between the fork and front hanger adjusts a tolerance stack of a bearing assembly connecting the fork to the front hanger assembly.

18. The riding device of claim 12, wherein the connection between the fork and front hanger is configured to be adjusted to control the speed and resistance of rotation of the front hanger about the front hanger pivot axis.

* * * * *